(12) United States Patent
Glenn, Jr. et al.

(10) Patent No.: US 8,794,380 B2
(45) Date of Patent: Aug. 5, 2014

(54) HELICOPTER EMPLACEABLE CART FOR TRAVEL ALONG ELECTRICAL POWER LINES

(75) Inventors: David R. Glenn, Jr., Fairfield, PA (US);
Kevin Keller, Gettysburg, PA (US);
Jason Keller, Gettysburg, PA (US)

(73) Assignee: Haverfield International Incorporated, Gettysburg, PA (US)

( * ) Notice: Subject to any disclaimer, the term of this patent is extended or adjusted under 35 U.S.C. 154(b) by 254 days.

(21) Appl. No.: 13/134,682

(22) Filed: Jun. 14, 2011

(65) Prior Publication Data

US 2012/0318611 A1    Dec. 20, 2012

(51) Int. Cl.
*H02G 1/02*         (2006.01)
(52) U.S. Cl.
USPC ....................................... 182/150; 244/118.1
(58) Field of Classification Search
USPC .................. 182/150, 10, 11; 244/118.1, 137.4
See application file for complete search history.

(56) References Cited

U.S. PATENT DOCUMENTS

| 413,389 | A | | 10/1889 | Cruishank | |
|---|---|---|---|---|---|
| 3,702,124 | A | * | 11/1972 | Highland | 182/14 |
| 4,039,141 | A | * | 8/1977 | Lindsey | 254/134.3 PA |
| 4,163,480 | A | | 8/1979 | Highland | |
| 4,185,562 | A | | 1/1980 | Hatori et al. | |
| D274,230 | S | | 6/1984 | Kelly | |
| D274,320 | S | | 6/1984 | Kelly | |
| 4,478,312 | A | * | 10/1984 | Kurtgis | 182/142 |
| 4,882,998 | A | | 11/1989 | Lipp | |
| 5,297,654 | A | * | 3/1994 | De Forges De Parny et al. | 182/150 |
| 5,494,132 | A | * | 2/1996 | Hansen | 182/150 |
| 6,186,275 | B1 | | 2/2001 | Charest et al. | |
| 7,552,685 | B2 | | 6/2009 | Frangos et al. | |
| 8,302,537 | B2 | * | 11/2012 | Quattlebaum | 104/112 |
| 2006/0150857 | A1 | * | 7/2006 | Pouliot | 104/112 |
| 2008/0202375 | A1 | | 8/2008 | Quattlebaum | |

OTHER PUBLICATIONS

Morepac Industries, Inc., LH60C-2H Spacer Cart, Operations & Maintenance Manual, 3 pages , Jul. 2007.
Tinker Tools Inc. , Tinker Spacer Cart (Sin gle Man) , two pages, at least as early as 2008.
Heli-Kart 6 photograph, one page, at least as early as Sep. 2010.
Photo of two linemen on electrical power lines with spacer cart, one pages, source unknown, 2008.

\* cited by examiner

*Primary Examiner* — Alvin Chin-Shue
(74) *Attorney, Agent, or Firm* — Stuart J. Friedman

(57) ABSTRACT

A cart for carrying a lineman along power line conductors includes a basket, vertical supports, a frame overhanging the basket, the frame mounting rollers which engage the conductors. The frame, vertical supports and basket define a generally C-shaped opening between the frame and the basket through which the conductors pass into vertical alignment with the rollers on the frame. The basket includes a wall remote from the opening which extends upwardly and away from the opening to provide a protected area for the lineman, the vertical supports being positioned between the opening and the area for protecting the lineman from conductors passing through the opening. The cart includes a safety cable affixed to the basket at the opening and removably attachable to the frame at the opening to provide a structural connection between the basket and the frame for strengthening the cart structure during cart movement.

25 Claims, 17 Drawing Sheets

HELICOPTER EMPLACEABLE CART FOR TRAVEL ALONG ELECTRICAL POWER LINES

FIELD OF THE INVENTION

The present invention relates to a cart for servicing energized electrical power lines and, more particularly, to a cart which can be safely emplaced on and travel along at least two parallel electrical power lines in the same horizontal plane and which supports at least one lineman in close proximity to the electrical power lines to be serviced.

BACKGROUND OF THE INVENTION

High voltage power lines transmit electrical power over long distances. A conventional high voltage transmission line utilizes three spaced apart, side-by side phases of conductors, each phase comprising one or more electrical conductors. Where more than one conductor is used in a phase, the conductors comprise a bundle of conductors which are generally supported parallel to one another. In one typical arrangement, each phase comprises a bundle of three triangularly arranged conductors in which two upper conductors are in the same horizontal plane and the third conductor is in a lower horizontal plane but is positioned centrally between the two upper conductors. It will be appreciated, however, that each phase can comprise a single conductor, two parallel conductors, or multiple conductors per bundle.

These high voltage power lines are generally supported by vertical support structures which vary in height between conventional wooden poles having upper cross bars to extremely tall towers which may be several hundred feet in height. The support structures extend upwardly from the ground and are, therefore, electrically grounded. As a consequence, the very high voltage, energized electrical power line conductors are supported on the towers by insulator strings, which frequently comprise a series of porcelain covered discs interconnected to form strings of varying length, in order to prevent the high voltage power line conductors from arcing to the grounded support towers.

In many instances, due to the height of the power lines above the ground or the terrain, maintenance and repair of high voltage electrical power lines cannot be accomplished from trucks. It has been known for years to do maintenance and repair on power lines using a helicopter to lift service personnel to the power lines. For example, one technique involves suspending a "bucket" housing in which a lineman can work from a helicopter alongside electrical power lines to allow the lineman to do work on the electrical power lines. More recently, work on power lines has been done by linemen seated on platforms suspended under helicopters which hover adjacent the power lines. This has worked well on the outer phases of three phase arrangements since bundles in these phases are readily accessible from helicopter-mounted platforms. However, more recently, due to federal, state and/or power company regulations, due to arcing concerns helicopters are no longer permitted to hover between phases and, therefore, the middle phase is no longer accessible to helicopter-mounted platforms. In order to access the middle phase of a three phase conductor arrangement, carts or skips have been developed which comprise generally rectangular, perforated metal or tubular enclosures or baskets suitable for housing a lineman and which include horizontal support frames above the enclosures or baskets having wheels or rollers for supporting the cart or skip upon one, two or more power line conductors. Illustrative skips are disclosed in U.S. Pat. Nos. 3,702,124, 4,163,480 and 4,478,312. Working from one of these carts allows the lineman to work on the middle phase conductor bundle. Some of these carts or skips are motorized and are able to self-propel along the lines. In many instances these carts are initially emplaced upon the power lines by ground-based cranes or are otherwise hoisted onto the power lines. More recently, helicopters have been used.

As is well known, high voltage power line conductors hang in catenaries between support towers, which may be a considerable distance apart. Thus, the conductors incline downward from a first support tower, have a reduced incline toward the center of the span between towers and incline upward as they approach the second support tower. Particularly where the span between support towers is long, the towers may be very tall. However, the vertical support structures which support the power line conductors as they approach the first tall tower of the span and as they leave the second tall tower of the span are generally considerably shorter. It will be appreciated, then, that the power line conductors extend from the last of the shorter approach towers to the top of the first tall tower at a very steep incline and, on the other side of the span, the power line conductors extend from the top of the second tall tower down to the first of the shorter towers at a very steep decline. A cart traveling along these power line conductors must be able to move up and down and along these steep inclines, and to service the power lines along these inclines, either under its own motive power or as a result of being raised or lowered by a towing device, such as a winch and cable.

Accordingly, there is a need for a cart for servicing energized electrical power lines which can be safely emplaced on and travel along at least two parallel electrical power lines, which can negotiate the steep inclines which may be encountered in moving along the lines, frequently under their own power, and which supports at least one lineman in close proximity to the electrical power lines to be serviced.

SUMMARY OF THE INVENTION

It is, therefore, a primary object of the present invention to provide a cart for moving a lineman along electrical power line conductors which can be emplaced on and travel along energized or de-energized power line conductors for servicing the power lines.

It is another object of the present invention to provide a cart which is structurally safe for being lifted by a lifting means onto and removed from a bundle of electrical conductors and for traveling along the conductors.

It is still another object of the present invention to provide a cart which can carry at least one lineman and which is safe for and protective of the lineman during lifting, emplacing on the conductors and traveling along the conductors.

It is yet another object of the present invention to provide a cart which is self-propelled for travel along the conductors.

It is another object of the present invention to provide a cart which includes positive engagement means for assuring good traction between the cart and the conductors during movement along inclined power line conductors.

It is still another object of the present invention to provide a cart which includes means for maintaining the cart floor on which the lineman stands substantially horizontal on inclined power line conductors.

The foregoing and other objects are achieved in accordance with the present invention by providing a cart for moving at least one lineman along electrical power line conductors suspended from support structures for servicing the power lines, said cart adapted to be lifted by a lifting means onto said electrical power line conductors, said cart comprising:

basket means for carrying the lineman, said basket means having a floor and enclosing perimeter walls;

frame means overhanging said basket means, said frame means mounting travel roller means projecting below said frame means for engaging with and rolling upon the power line conductors to facilitate movement of the cart along the conductors;

connecting means extending generally vertically between and interconnecting said frame means and said basket means with said basket means supported below said frame means, said frame means, said connecting means and said basket means defining a generally C-shaped opening between said frame means and said basket means through which said conductors pass into vertical alignment with said travel roller means on said frame means when said lifting means lifts said cart to said conductors and moves it horizontally relative to said conductors through said opening, said lifting means lowering said travel roller means of said cart onto said conductors when said travel roller means and said conductors are in vertical alignment;

said basket means including a portion remote from said opening, said connecting means being positioned between said opening and said remote basket portion for preventing said conductors from reaching said remote basket portion when said conductors pass through said opening, whereby said connecting means provide a protected area in said basket means where said lineman cannot be struck by the conductors.

In another aspect of the present invention, the cart further includes an elongate safety cable affixed to said perimeter wall at said opening, said cable including means at one end adapted to be removably attached to said frame means at said opening and means for tensioning said safety cable between said basket means and said frame means, whereby said safety cable provides a structural connection between said basket means and said frame means which strengthens and stabilizes the cart structure.

In still another aspect of the present invention said conductors comprise a bundle including two parallel conductors arranged in a horizontal plane which is above any other conductors in the bundle and said travel roller means comprises at least two pair of horizontally parallel travel rollers mounted on said frame means, each pair being positioned to be in vertical alignment with one of said two upper conductors when said cart is lifted to a position above said conductors, the travel rollers comprising each pair being spaced apart along the length of each said upper conductor and dimensioned for engaging and rolling along said conductors.

In yet another aspect of the present invention, said basket means is generally rectangular in shape and said perimeter walls include a front wall at said opening, a rear wall and a pair of side walls interconnecting said front and rear walls, said connecting means comprises at least one vertical support member extending upwardly from each said side wall for supporting said frame means and said remote basket portion comprises a bay area defined by said rear wall extending upwardly and rearwardly from the floor of said basket means, said bay area providing a protected area for said lineman which is rearward of said vertical support members and remote from said opening.

In another aspect of the present invention, said conductors comprise a bundle of three triangularly arranged conductors in which two conductors are parallel in the same horizontal plane and a third conductor is in a lower plane but is positioned centrally between the two upper conductors and said cart further includes third conductor roller means supported by said frame means in vertical registry with said third conductor when said cart is positioned on said two upper conductors, said third conductor roller means being movable vertically into contact with said third conductor for maintaining the three conductors substantially in their original triangular spacing.

In still another aspect of the present invention, said cart further includes a grounding roller electrically connected to said cart and mounted on said frame means in vertical alignment with one of said upper conductors when said cart is positioned on said two upper conductors, said grounding roller being mounted for pivotal movement between a storage position wherein the grounding roller is out of contact with said conductors and an active position wherein said grounding roller is in electrical contact with one of said upper conductors.

In yet another aspect of the present invention, said cart further includes at least one positive engagement roller means supported by said frame means for contacting the underside of each conductor which is engaged by a driven travel roller and urging said conductor into closer engagement with said driven travel rollers for improved traction.

In another aspect of the present invention, said frame means is generally rectangular in shape comprising at least a front member at said opening, a rear member and a pair of side members interconnecting said front and rear members, a pair of axles extending between said front and rear members, each axle including two travel rollers spaced apart along the length of said axle and dimensioned for engaging and rolling along said conductors, said cart further including a mechanically operated disc brake on each axle, whereby the lineman can operate the disc brakes to slow or stop movement of the cart along the conductors.

DESCRIPTION OF THE PREFERRED EMBODIMENTS

The cart of the present invention will be described herein, for ease of understanding, in connection with conventional power lines having three side-by-side, spaced apart phases, each phase comprising a bundle of three triangularly arranged conductors in which two upper conductors are parallel in the same horizontal plane and the third conductor is in a lower plane but is positioned centrally between the two upper conductors. It will be appreciated, however, that the cart of the present invention can be adapted to be equally useful with any bundle configuration which includes at least two upper parallel conductors in the same horizontal plane on which the cart can be emplaced. The cart of the present invention can be safely emplaced upon the power lines by a helicopter, is capable of being suspended from and supported by a pair of horizontally spaced apart electrical conductors and, in two embodiments of the invention, is motorized and, therefore, is movable along the power lines under its own power.

Figure 1:
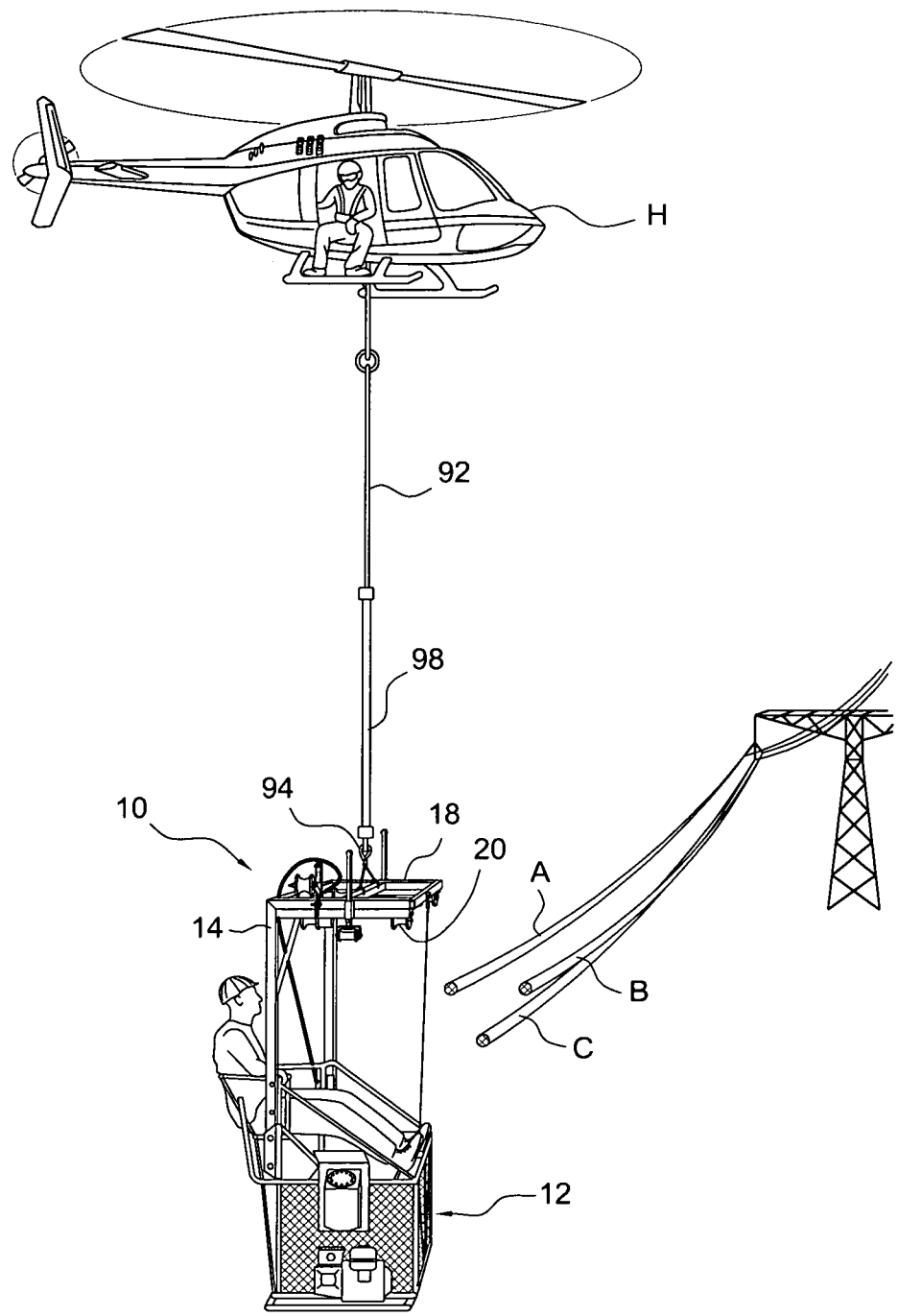
FIG. 1 is a perspective view of a first embodiment of the cart of the present invention showing a helicopter as the lifting means for emplacing the cart on a bundle of high voltage electrical power line conductors.
Figure 2:
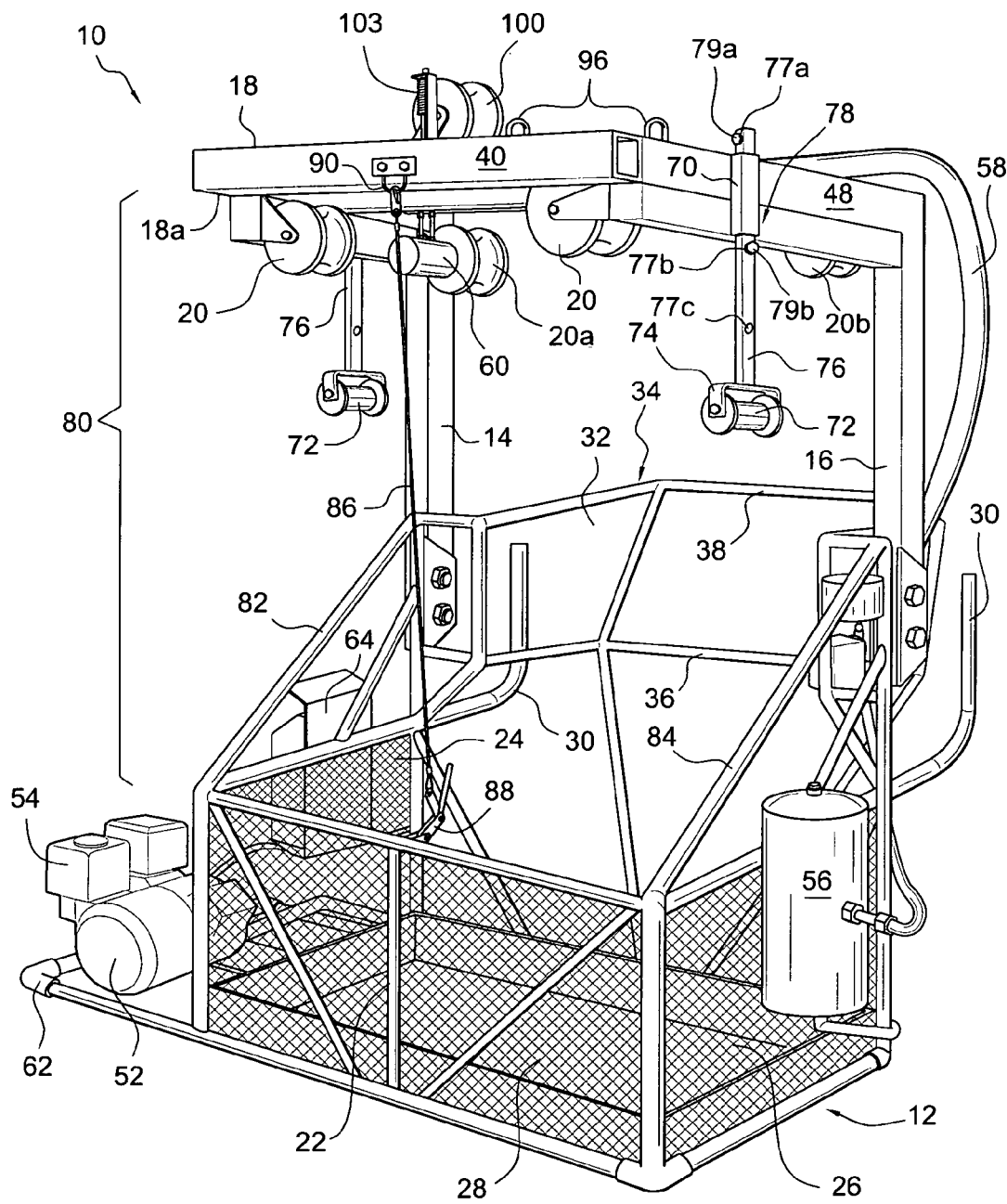
FIG. 2 is a perspective view of the cart of FIG. 1 viewed from its front right side.
Figure 3:
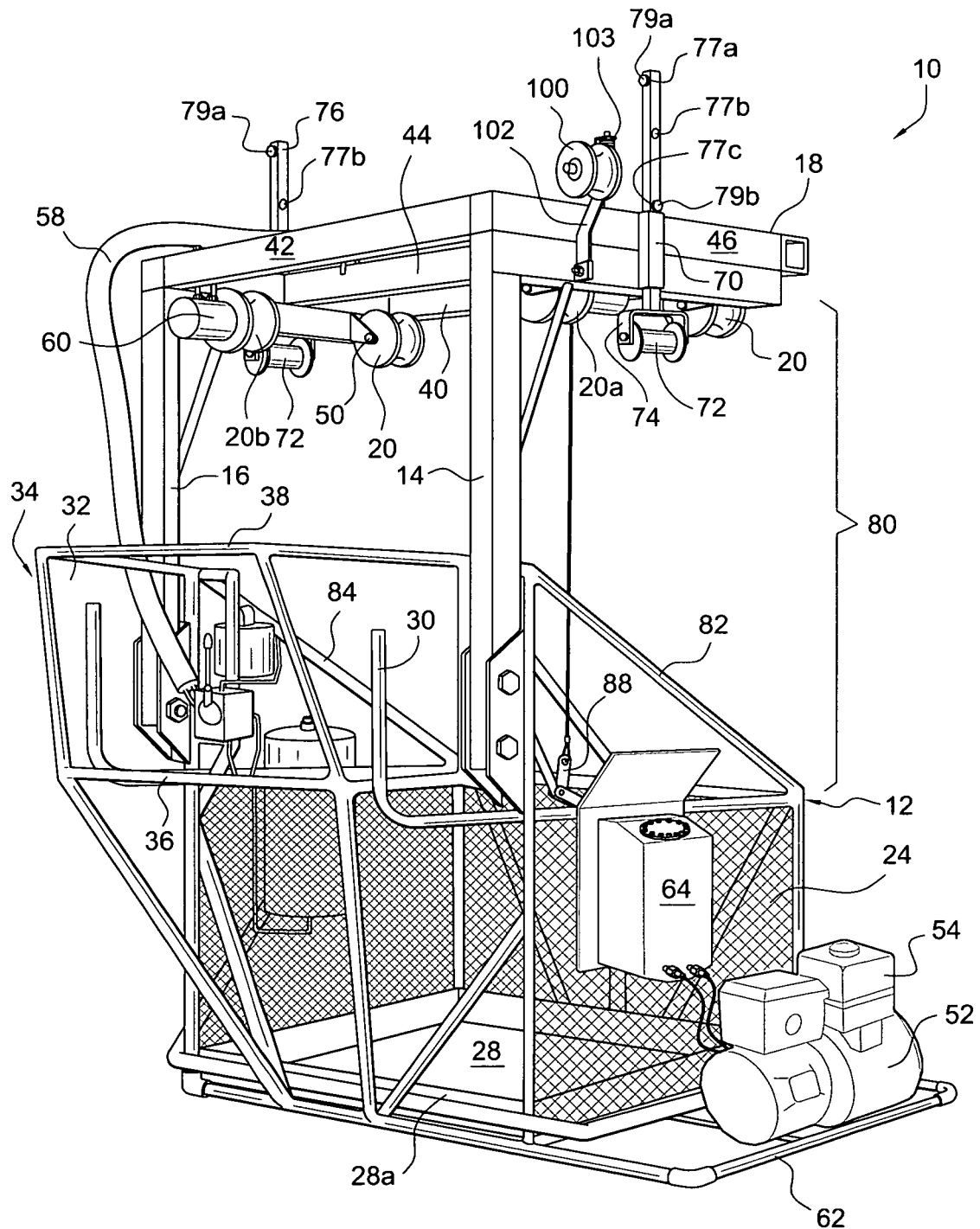
FIG. 3 is another perspective view of the cart of FIG. 1 viewed from its rear left side.
Figure 4:
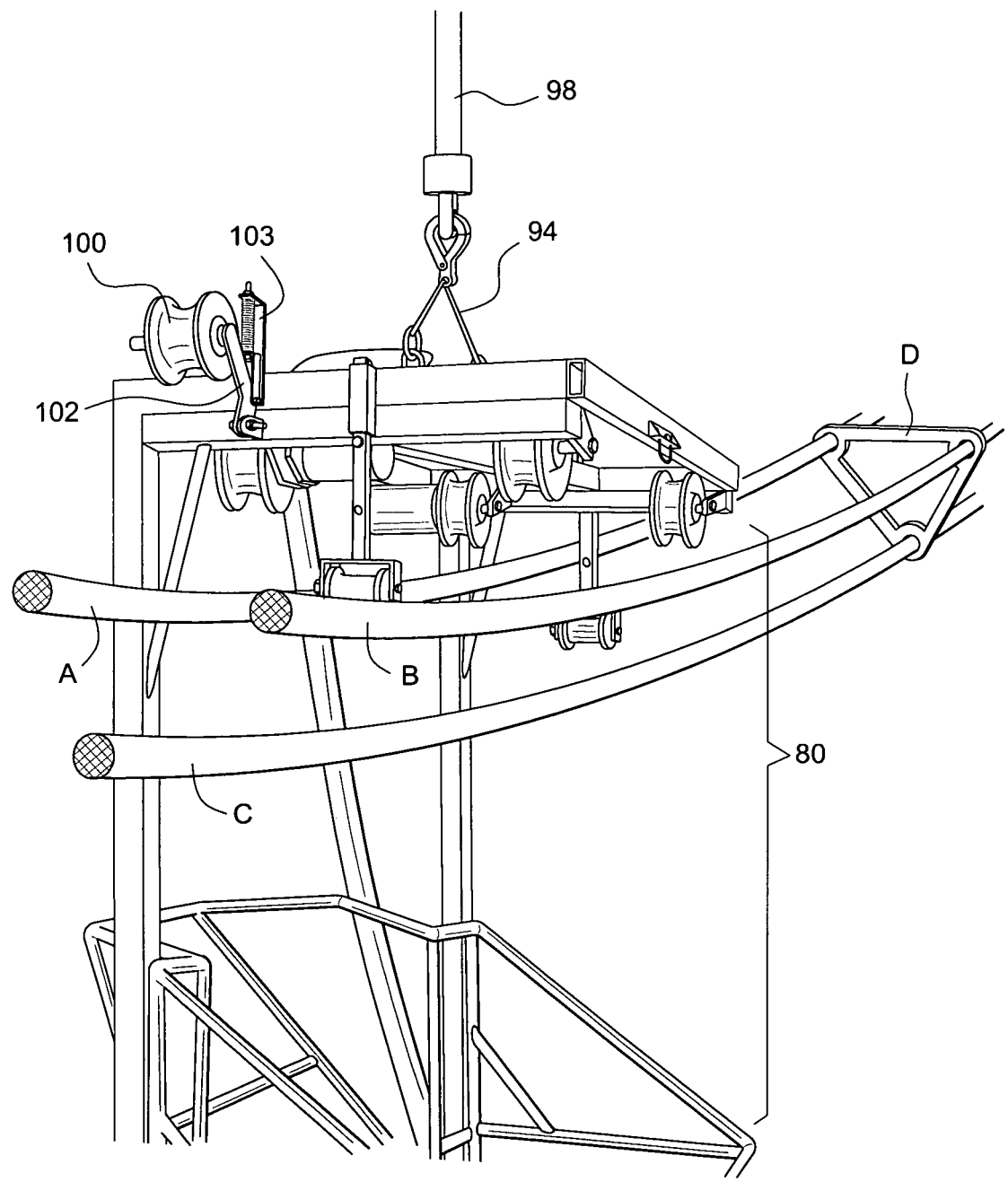
FIG. 4 is a perspective view of the upper portion of the cart of FIG. 1 immediately before the cart is emplaced by a helicopter upon and electrically engages the conductors.
Figure 5:
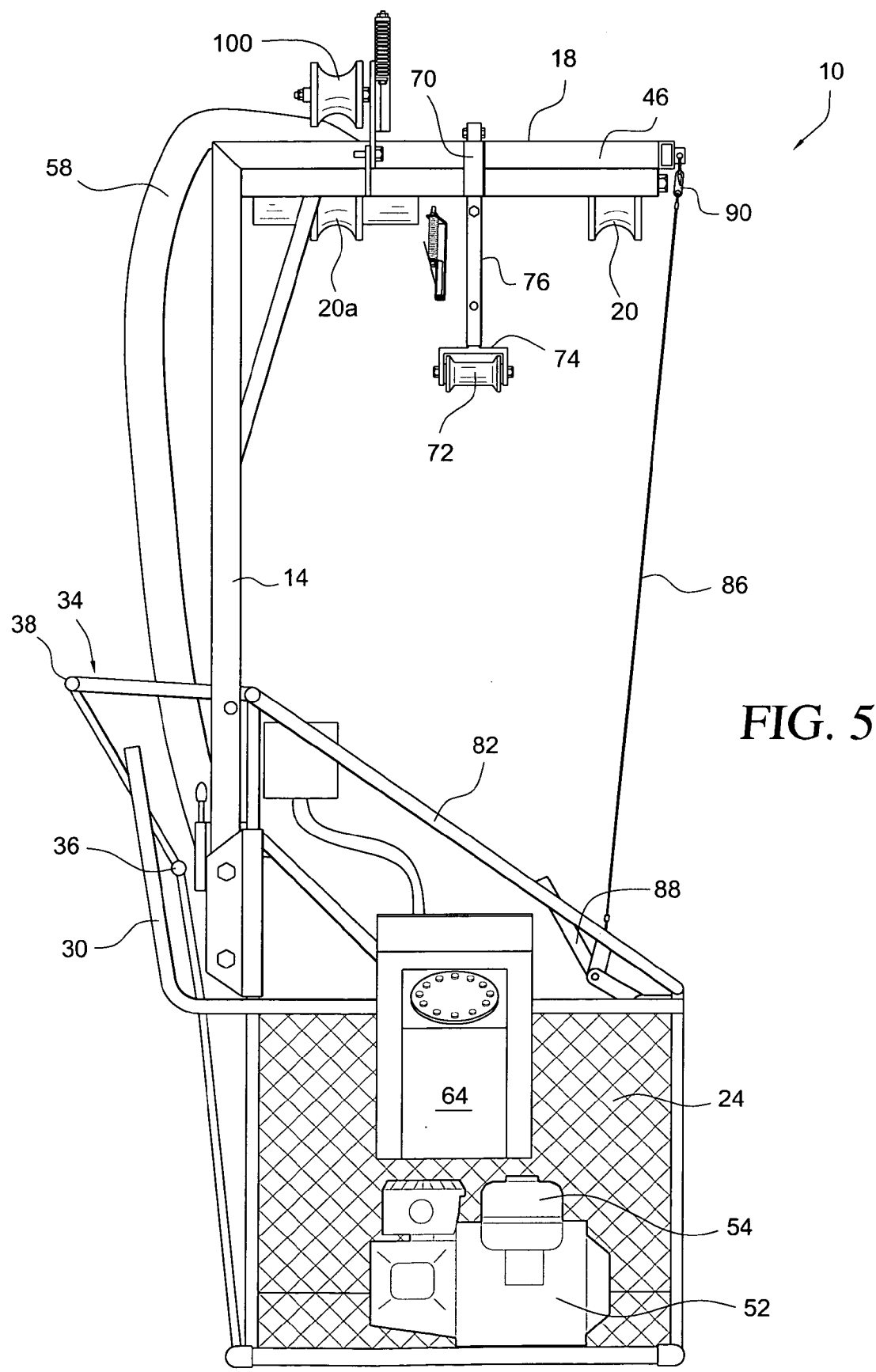
FIG. 5 is a left side elevational view of the cart of FIG. 1.
Figure 6:
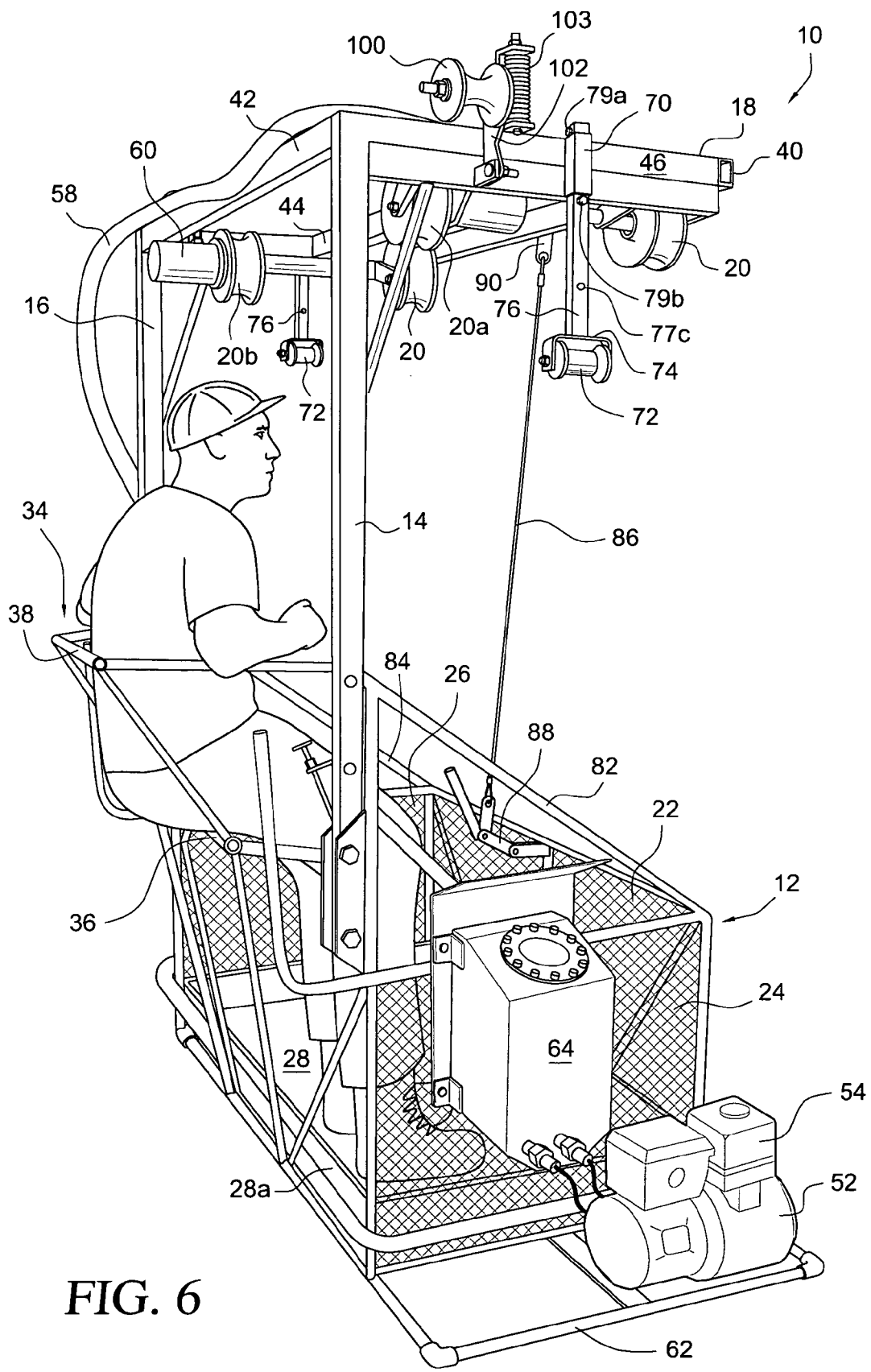
FIG. 6 is a perspective view of the cart of FIG. 1 viewed from its rear left side showing a lineman safely seated within the bay defined by the rear wall of the cart.
Figure 7:
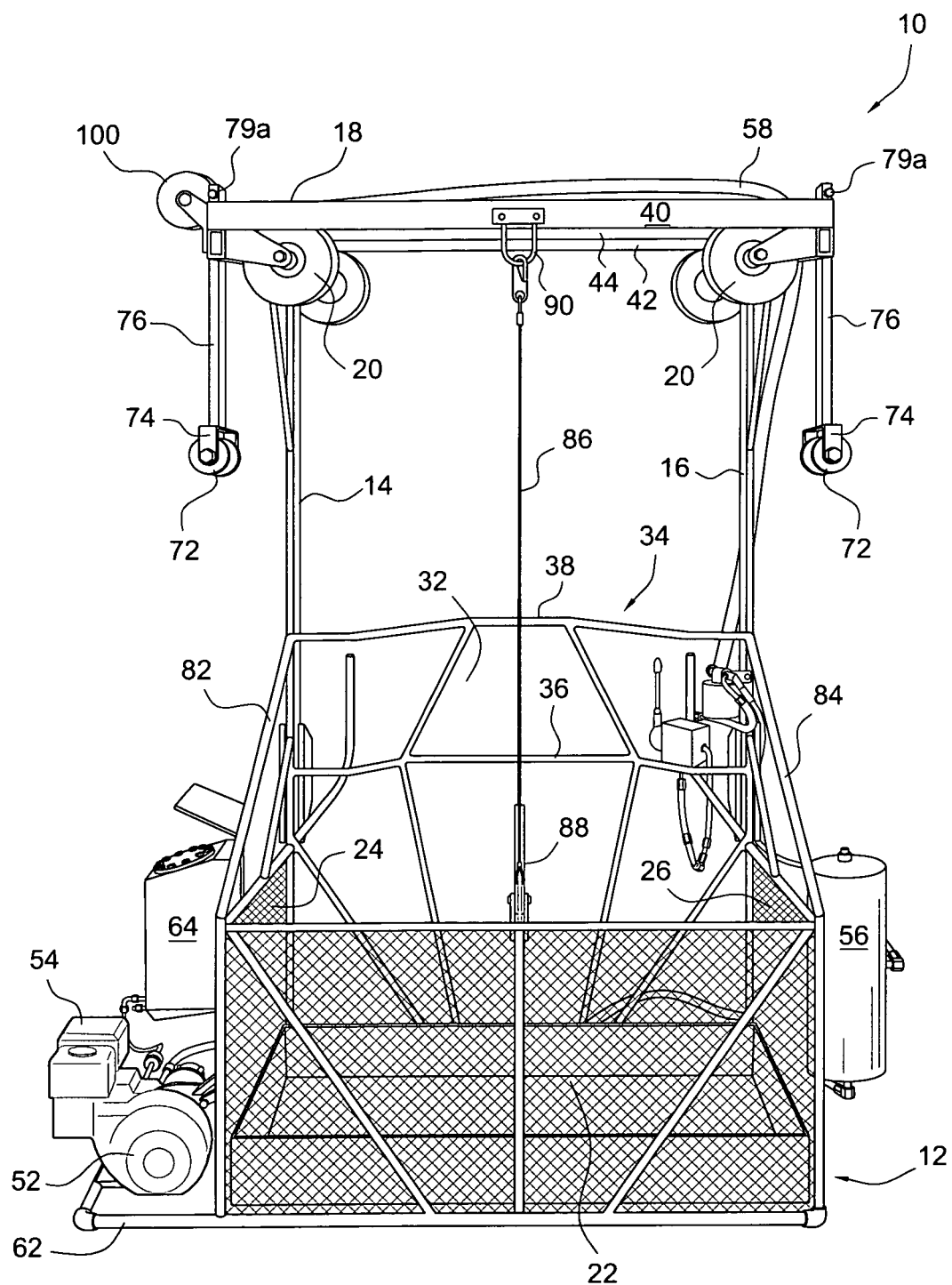
FIG. 7 is a perspective view of the cart of FIG. 1 viewed from the front.
Figure 8:
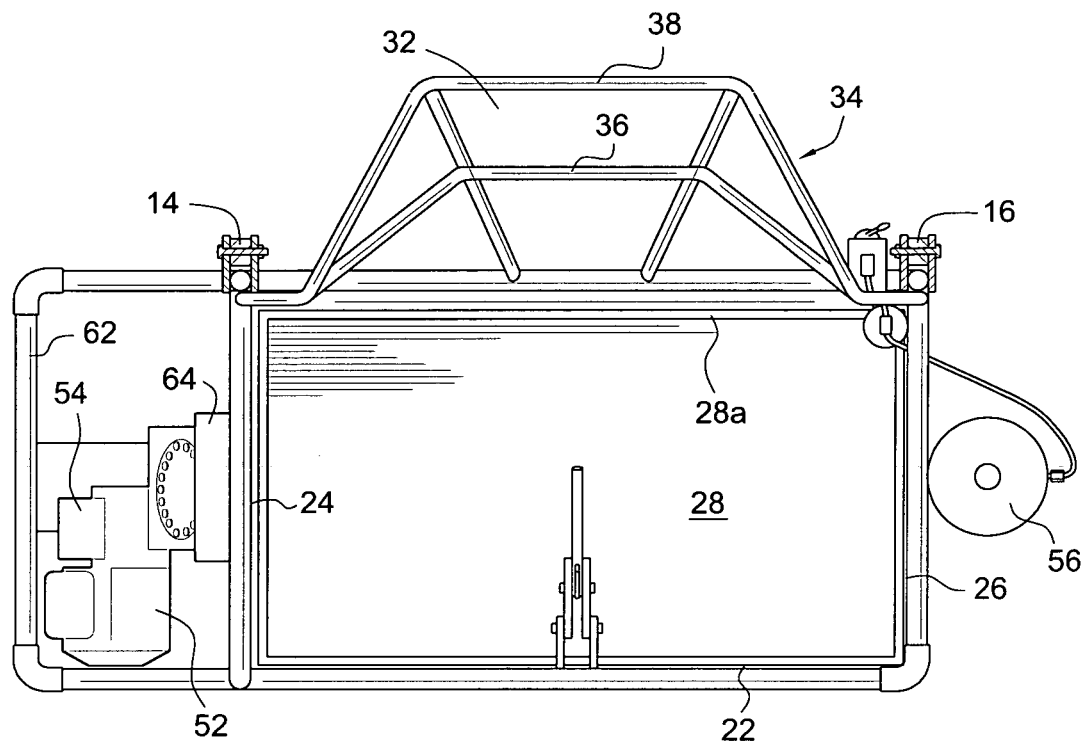
FIG. 8 is a sectional view of the cart of FIG. 1 looking down into the basket from a horizontal plane passing through the vertical support members above the inclined guide rails.
Figure 9:
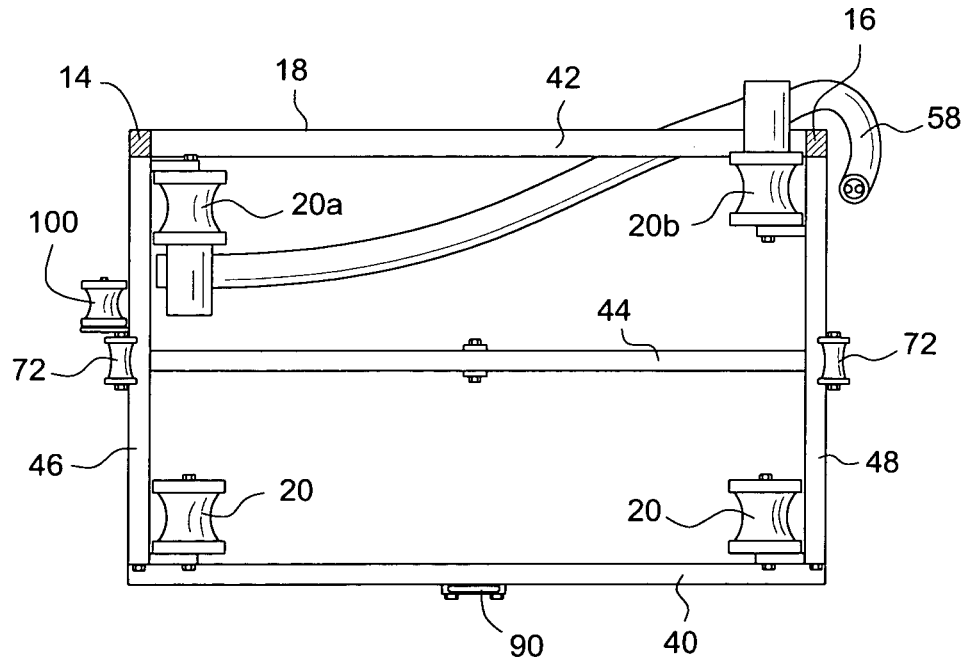
FIG. 9 is a sectional view of the cart of FIG. 1 looking up towards the horizontal upper frame from a horizontal plane passing through the vertical support members above the inclined guide rails.
Figure 10:
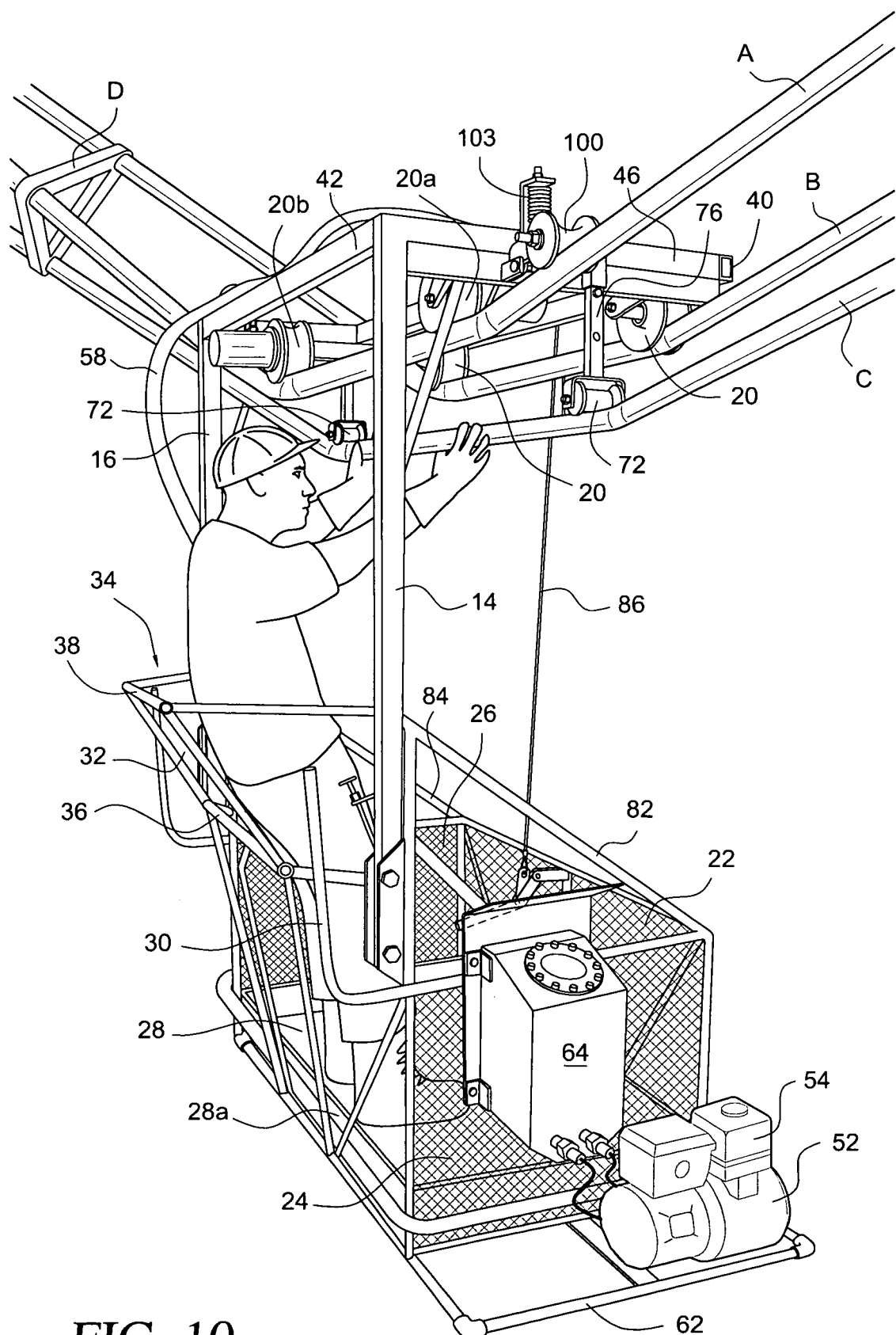
FIG. 10 is a perspective view of the cart of FIG. 1 emplaced upon and engaging a three conductor bundle, viewed from the rear left side, showing a lineman standing within the basket for servicing a conductor.
Figure 11:
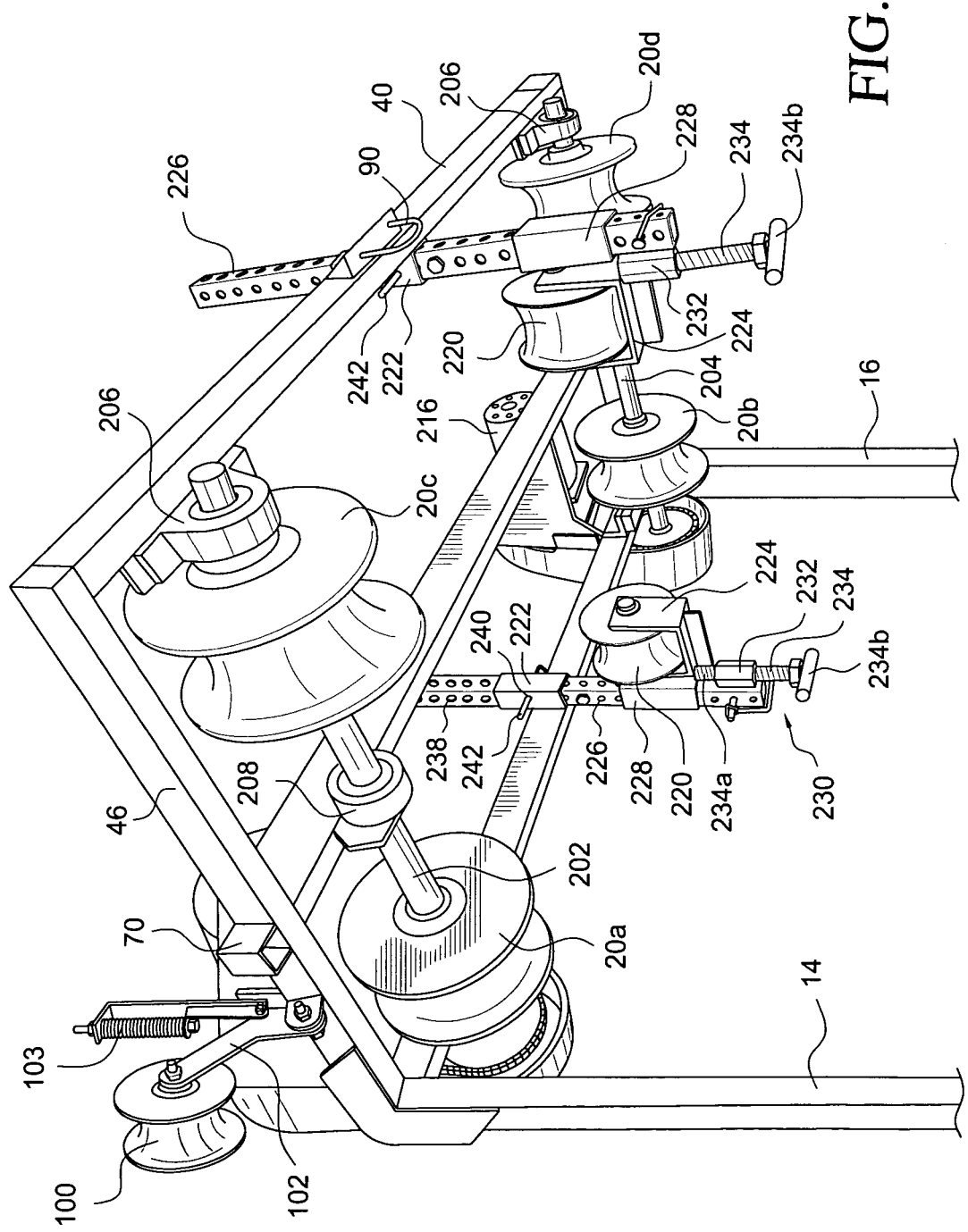
FIG. 11 is a perspective view of a second embodiment of the cart of the present invention looking up from within the basket towards the horizontal upper frame.
Figure 12:
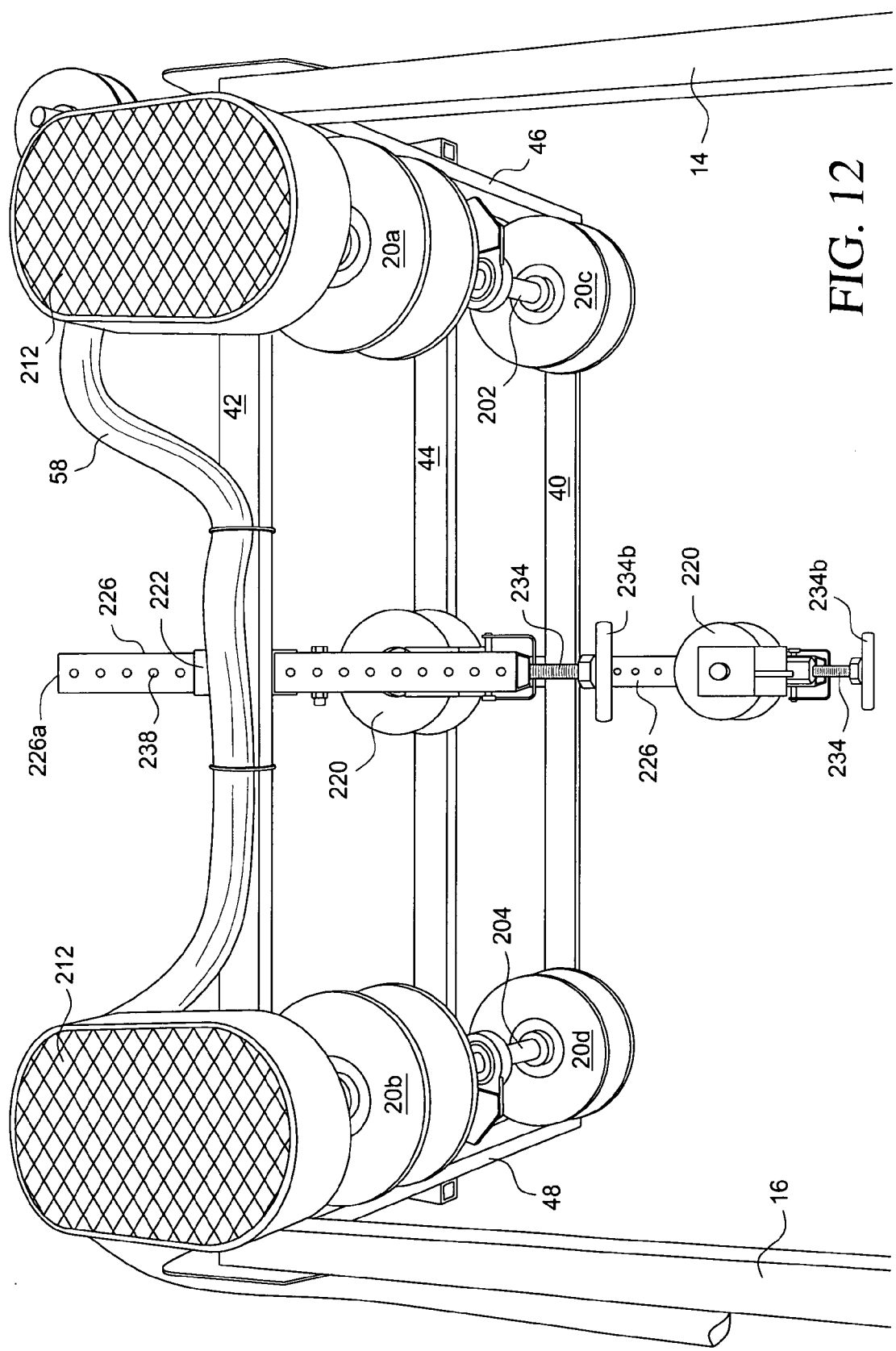
FIG. 12 is a perspective view of the horizontal upper frame of the cart of FIG. 11 viewed from the rear.
Figure 13:
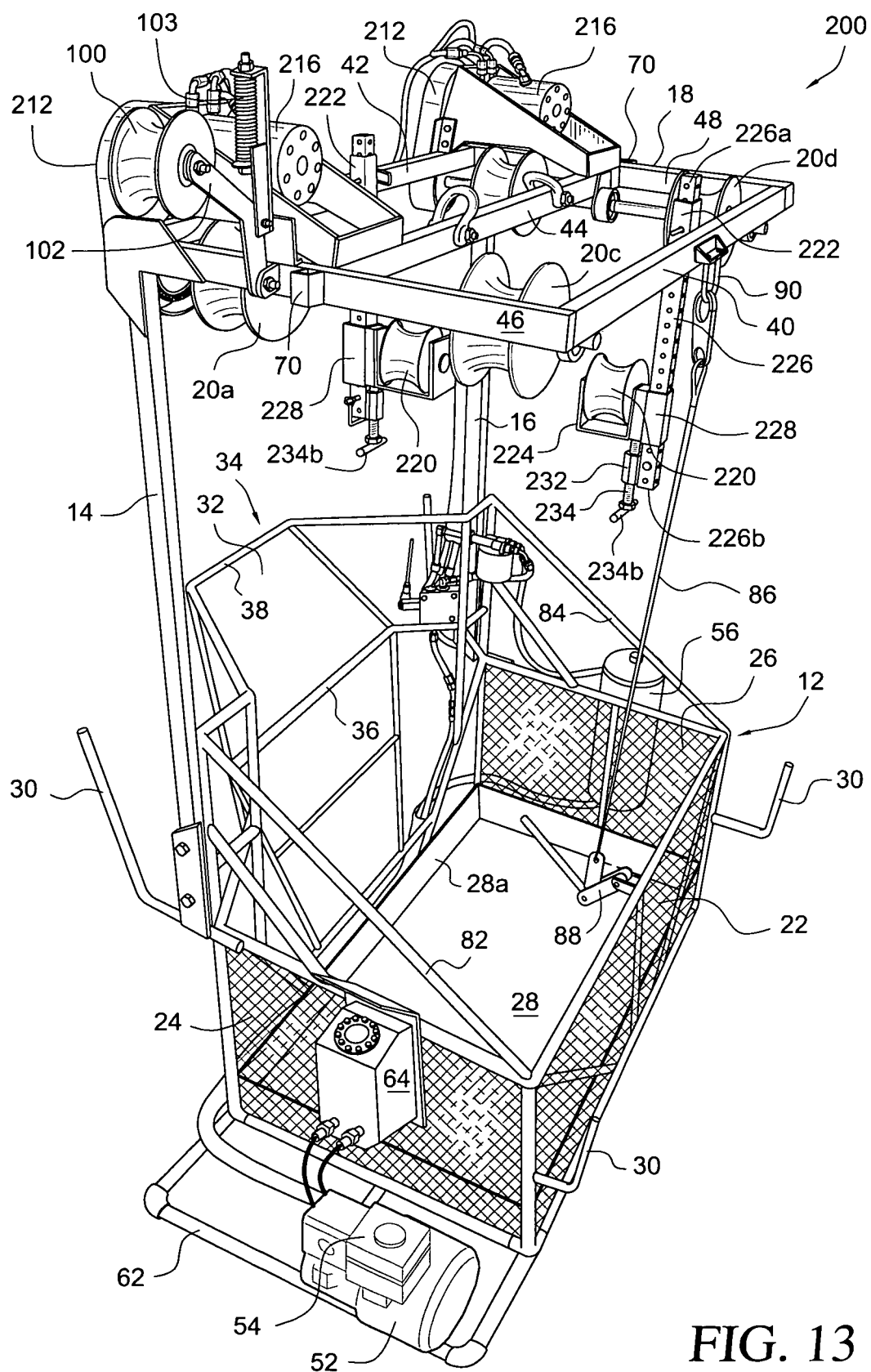
FIG. 13 is a perspective view of the cart of FIG. 11 viewed from above the front left side.
Figure 14:
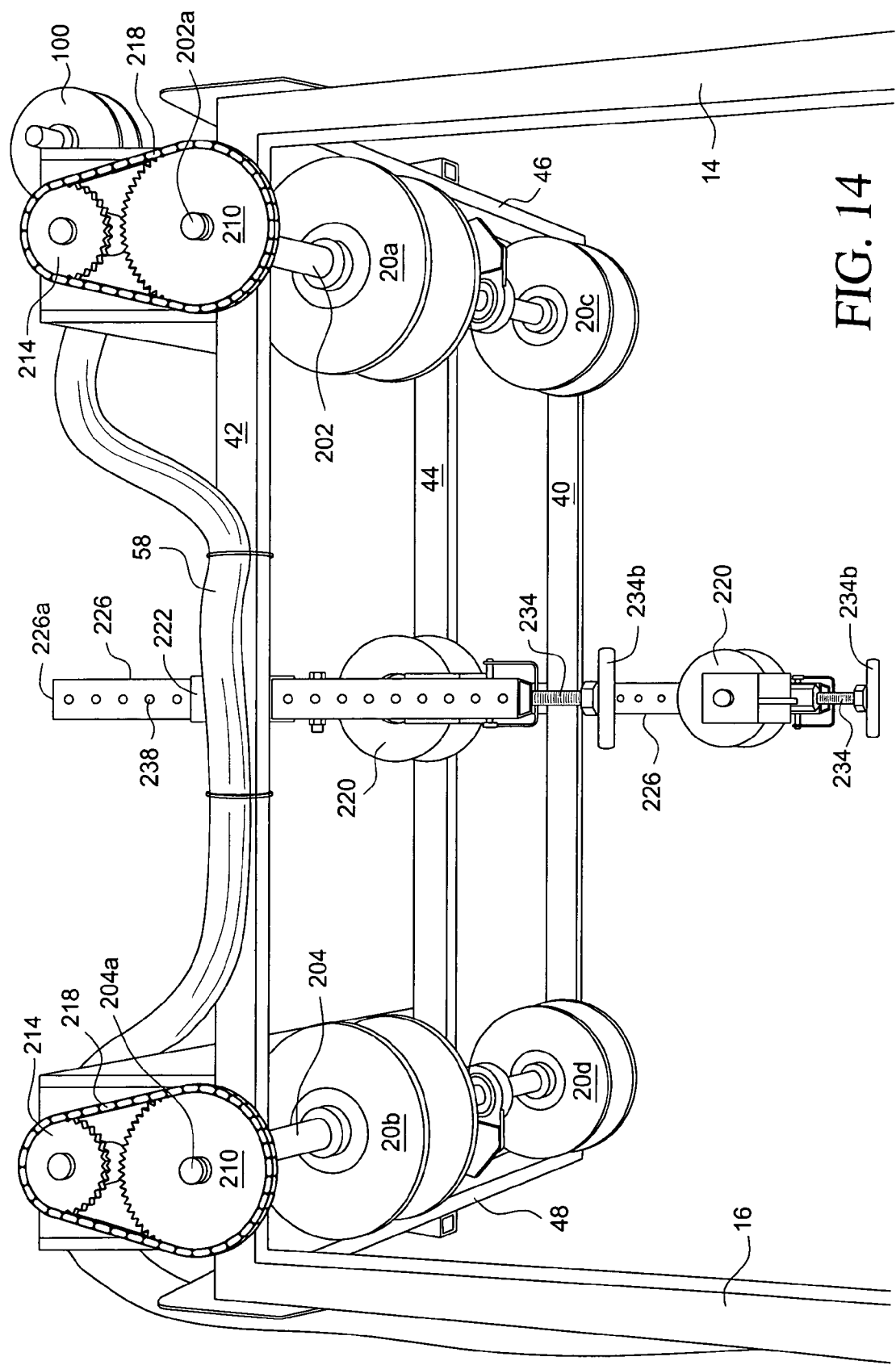
FIG. 14 is a perspective view of the horizontal upper frame of the cart, as in FIG. 12, with the metal enclosure housings removed.
Figure 15:
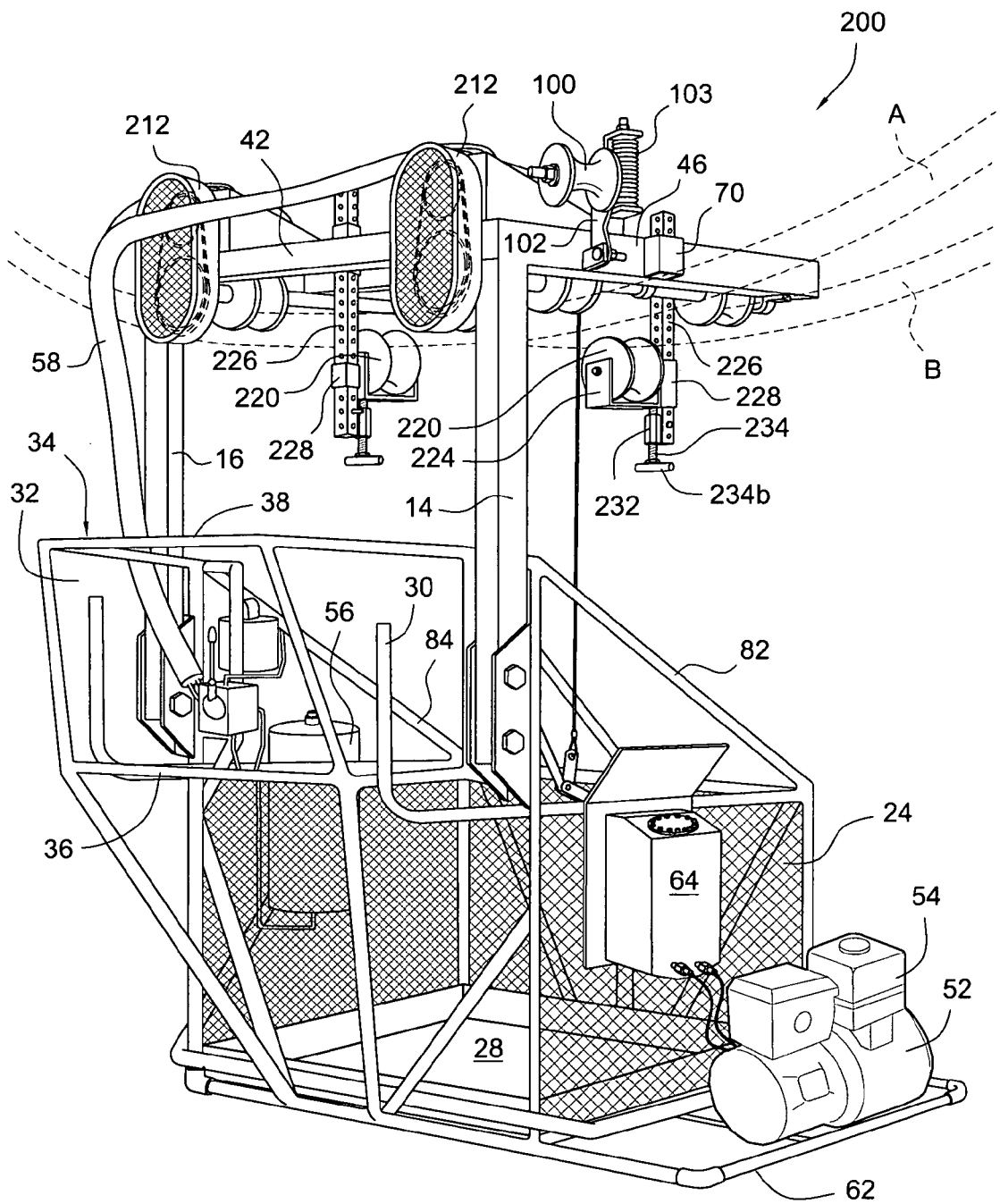
FIG. 15 is a perspective view of the cart of FIG. 13 emplaced upon and engaging a two conductor bundle (shown in phantom), viewed from the rear left side.

Referring to FIGS. 1-10, a first embodiment of the cart 10 of the present invention comprises a tubular, generally rectangular basket 12, tubular vertical support members 14, 16 extending upwardly from the basket 12 and a horizontal, generally rectangular tubular upper frame 18 overhanging basket 12 supporting wheels or rollers 20 which engage with the power line conductors A, B. Rollers 20 may be electrically conductive, in which case they electrically interconnect cart 10 and power line conductors A, B. Alternatively, rollers 20 may be non-conductive, e.g., metal rollers coated with rubber or plastic rollers, in which case other means such as conductive grounding rollers 100, as described more fully hereinafter, must be used on energized power lines to assure that cart 10 is maintained at the same electrical potential as the conductors A, B. The basket 12 comprises a generally rectangular tubular structure which, viewed from the front as in FIG. 7 (the terms "front", "rear", "left" and "right" are used for ease of description and understanding and refer to the cart configuration illustrated in FIG. 7), has front wall 22 and left side and right side walls 24, 26 formed of expanded metal extending upwardly about two feet, i.e., to about thigh height of a lineman standing in the basket 12, from a generally rectangular floor 28. Floor 28 is desirably formed of a strong, light weight metal, such as aluminum and is supported by a tubular sub-structure therebeneath. The basket 12 is sufficiently spacious to allow at least one lineman to comfortably work on the power line conductors A, B, C while standing on the basket floor 28 and to provide space to store necessary equipment. L-shaped tubular projections 30 desirably extend rearwardly and upwardly from the upper rear left and right side expanded metal walls 24, 26 (and, optionally, from the front left and right side walls 24, 26, as shown in FIG. 13) for storing equipment used when servicing the power lines, such as spacers.

A basket floor 28 having dimensions of about 27" front to back and about 45" left to right has been found to work well, although it will be appreciated that the basket size may be larger or smaller depending upon the tasks to be performed, the number of lineman to be housed and any weight limitations imposed by the equipment, power lines or other circumstances. The rear wall 32 of the basket 12 comprises a tubular structure which extends upwardly and rearwardly from the tubular sub-structure which supports floor 28 adjacent its rear edge 28a to define a rearwardly projecting bay 34 projecting beyond upper frame 18 in which the lineman in the basket 12 may safely sit, with his buttocks supported by an intermediate horizontal tubular member 36 positioned above the height of the left and right side expanded metal walls 24, 26 (desirably about 32" above the basket floor) and projecting (for example, about 8") rearwardly of the rear edge 28a of the basket floor 28. While seated, the lineman's back is supported by an upper horizontal tubular member 38 (desirably about 42" above the basket floor) positioned above the intermediate tubular member 36 and projecting rearwardly of the intermediate tubular member (desirably about 15" rearwardly of the rear edge 28a of the basket floor 28). Rear wall 32 also includes vertical and horizontal tubular structure which supports intermediate horizontal tubular member 36 and upper horizontal tubular member 38 and provides tubular hand hold areas which the lineman can grasp to stabilize his position within the basket 12, particularly during cart travel along conductors and on/off conductor operations. It will be appreciated that approximate dimensions are provided for one illustrative basket 12 suitable for carrying one lineman and necessary equipment, that these dimensions are merely illustrative and may be varied as circumstances and needs require and that the provision of illustrative dimensions is not intended to limit the scope of the invention in any way.

The pair of vertical tubular support members 14, 16, desirably of rectangular cross-section, extend upwardly from the rear portions of the left and right side walls 24, 26, desirably from the left and right rear corners, respectively, of the tubular basket 12 and support a horizontal, generally rectangular tubular upper frame 18 which overhangs the basket floor 28 at a height of, desirably, about 1-2 feet above the lineman's head when he is standing in the basket 12. The upper frame 18 comprises a front 40, a rear 42 and at least one intermediate 44 tubular member, desirably of rectangular cross-section, extending from left to right across the upper frame 18. Tubular members 40, 42, 44 are joined to left and right side tubular members 46, 48, desirably of rectangular cross-section, extending front to back of the upper frame 18 to complete the desirably rectangular configuration of upper frame 18. Horizontally parallel rollers 20, which are preferably conductive, are supported by the upper frame 18 at each of the four inside corners thereof and are mounted for rotation about front to rear extending axes 50, thus allowing the rollers 20 to be positioned upon two spaced apart power line conductors A, B and to travel forward or backward along the conductors. The dimensions of the rollers 20 are selected to correspond to the diameter of the conductors A, B upon which they will be positioned. Most desirably, cart 10 is self propelled along the conductors. For this purpose, one left side roller 20a and one right side roller 20b are desirably the drive rollers, preferably the rear left and rear right side rollers, and are powered by a gasoline engine 52 which drives a hydraulic pump 54 which draws hydraulic fluid from a hydraulic tank 56 and forces the fluid through hydraulic lines 58 to power hydraulic motors 60 at the drive rollers 20a, 20b. The hydraulic tank 56 is positioned outside the basket side walls 24, 26 but affixed thereto on one side thereof, shown here on the right side. The gasoline engine 52 and hydraulic pump 54 are mounted and supported on a projecting tubular support member 62 which extends beyond one side of the basket 12, shown here on the left side, and is affixed to the tubular sub-structure supporting the basket floor 28. The fuel tank 64 for the gasoline engine 52 is also desirably positioned outside the basket side walls 24, 26 but affixed thereto, desirably on the side of basket 12 above the engine 52 and pump 54. A lineman positioned in the basket 12 and seated in the rearwardly projecting bay 34 can control the movement of cart 10 along the conductors A, B by operating engine rpm and hydraulic direction and speed controls positioned desirably near the right and left rear corners of the cart 10 at locations which are convenient for the lineman seated in the bay 34. Braking means (not shown) may be desirable to maintain the cart 10 in position when a lineman is servicing the conductors. It will be appreciated that the tubular members comprising the basket 12, vertical supports 14, 16 and upper frame 18 are all desirably formed of steel, although other structural materials may also be suitable, as is well known in the art, and the vertical support members 14, 16 and the horizontal upper frame members 40, 42, 44, 46, 48 are desirably formed of tubular steel having a rectangular cross-section to maximize strength while limiting weight.

When the cart 10 is emplaced by a helicopter upon the two parallel upper conductors A, B of a triangularly arranged three conductor bundle, the weight of the cart 10 causes conductors A, B to sag and for the underside 18a of the upper frame 18 to contact and rest upon the lower central conductor C. If the cart 10 travels along the conductors A, B while the upper frame underside 18a is resting on the central conductor C, the upper frame 18 will drag along the conductor C, impede movement of the cart 10 and possibly damage the conductor C. To prevent this, on each of the right and left side members 46, 48 of upper frame 18, at positions centrally aligned between the conductor-engaging rollers 20, and, therefore, in vertical registry with central lower conductor C, a tubular sleeve 70 with its elongated opening oriented vertically is mounted along the outside of each of the right and left side upper frame members 46, 48. A side roller 72 mounted in a roller housing 74 and oriented and dimensioned for rolling along the central lower conductor C is supported on an elongated mounting bar 76 which extends upwardly from the roller housing 74 through each of the tubular sleeves 70, allowing the elongated mounting bar 76 to slide vertically in the sleeves 70 and side rollers 72 to be positioned between a storage position wherein the roller housings 74 are adjacent the lower end of the sleeves 70 and an active position wherein the side rollers 72 are lowered into contact with the central lower conductor C. Locking means 78 are provided to lock the side rollers 72 into one or more positions.

For example, locking means 78 may comprise three apertures 77a,b,c in elongated mounting bar 76, a first aperture 77a positioned at the end of mounting bar 76 remote from side roller 72, a second aperture 77b positioned between the roller housing 74 and aperture 77a at a distance from aperture 77a which is slightly greater than the length of tubular sleeve 70 and a third aperture 77c positioned between roller housing 74 and aperture 77a at a distance from roller housing 74 which is slightly greater than the length of tubular sleeve 70. A stop bolt 79a extends through first aperture 77a to prevent mounting bar 76 from sliding through and out of tubular sleeve 70. When side roller 72 is in its storage position (see FIG. 3), third aperture 77c is above the top of tubular sleeve 70 and pin 79b is inserted into and extends through aperture 77c to maintain side roller 72 in its storage position. To place side roller 72 in its active position (see FIG. 6), pin 79b is removed from aperture 77c, allowing mounting bar 76 to slide vertically downwardly through sleeve 70 until side roller 72 contacts conductor C. Sufficient downward pressure is applied to conductor C to force it downwardly until second aperture 77b becomes visible just below the bottom of tubular sleeve 70, at which time pin 79b is inserted into and extends through aperture 77b, preventing conductor C from raising up and pushing mounting bar 76 upwardly through tubular sleeve 70. When the side rollers 72 are in contact with the lower central conductor C, they maintain the conductor C in a lowered position relative to the two upper conductors A, B and out of contact with the underside 18a of the upper frame 18 of cart 10. Side rollers 72 also serve to maintain the three conductors A, B, C in substantially their original triangular spacing should a spacer D therebetween have to be removed for replacement. It is frequently difficult for a lineman to apply sufficient downward force to lower central conductor C to reposition it relative to the two upper conductors A, B after the two upper conductors A, B have sagged under the weight of cart 10. To assist him, a ratchet operated chain hoist (not shown) is attached to a shackle (not shown) on the top of the expanded metal wall side wall 24, 26 below the conductor C to force the lower central conductor C downwardly to the desired position to allow the side rollers 72 to be lowered into contact therewith and locked via pin 79b in position.

It will be appreciated that the configuration defined by the tops of basket walls 22, 24, 26, the vertical support members 14, 16 and the underside 18a of horizontal upper frame 18 is generally C-shaped in side elevation, i.e., there is an opening 80 defined between the top of the expanded metal front wall 22 and the underside of the front member 40 of upper frame 18. This advantageous configuration allows the cart 10 to be more easily mounted to the conductors A, B by a helicopter H without the helicopter H approaching too close to the outer phases of the power line. According to the invention, the helicopter H hovers generally above the middle phase of the power line, lowers the cart 10 until the opening 80 is in horizontal registry with the three conductor bundle, then moves the cart 10 horizontally such that the conductors A, B, C pass through the opening 80 until the two upper conductors A, B are vertically aligned with and below the pairs of left and right side rollers 20 mounted to the upper frame 18 (see FIG. 4), at which point the cart 10 is lowered by the helicopter H until the rollers 20 engage the two upper conductors A, B. To facilitate this maneuver and to aid in guiding the conductors A, B into alignment with the rollers 20, the basket 12 includes inclined left and right side tubular guide rails 82, 84 extending forwardly and downwardly from the upper horizontal tubular back support member 38 at the left and right side vertical support members 14, 16 to the upper left corner and upper right corner, respectively, of the expanded metal front wall 22. The contour of these tubular guide rails 82, 84 deflects the conductors A, B upwardly toward the conductor engaging rollers 20.

Emplacing any cart upon the conductors A, B requires great skill by the helicopter pilot, especially when weather conditions are poor or there are gusting winds. Moreover, despite the obvious advantages of a C-shaped cart configuration having an opening 80 along the front of the cart 10 for emplacing a cart on conductors A, B, the lineman in the basket 12 can be in a precarious and potentially dangerous situation during on/off conductor operations since unforeseen circumstances, such as sudden wind gusts, could cause the cart 10 to strike against the conductors, unbalancing the lineman and causing the basket to tip, or cause the conductors A, B passing through the opening 80 to strike the lineman. The few carts which have utilized a C-shaped mounting frame have either positioned the lineman considerably away from the conductors, such as in U.S. Pat. No. 5,494,132 wherein the lineman are positioned on ladders which depend and are remote from the mounting frame, or have not allowed the lineman to enter the basket until after it has been emplaced on the power lines, such as in U.S. Pat. No. 6,186,275. In accordance with the present invention, the lineman is positioned in basket 12 close to the conductors A, B, C which he is to service, yet the safety of the lineman is significantly enhanced by the configuration of the basket 12. When the lineman is positioned within the projecting bay 34 and seated and supported by rear wall 32 and horizontal tubular structure 36, 38 of the bay 34, he is in a secure and protected position. He is stabilized against falling caused by sudden movement or tipping of cart 10 by being seated in the bay 34 and able to hold on to the tubular railings around him. At the same time, he is protected by the vertical tubular support members 14, 16 from the conductors A, B, C striking him should they enter too far through opening 80. In his protected sanctuary within the bay 34, the conductors A, B, C cannot reach the lineman.

After the conductor-engaging rollers 20 are emplaced upon the two upper conductors A, B by the helicopter H, a safety cable 86 is attached by the lineman between the top of the expanded metal front wall 22 and the front tubular member 40 of the upper frame 18. This is facilitated by providing a steel safety cable 86 within basket 12 which is attached at its lower end to an over center chain binder 88 affixed to a tubular support forming a part of the front wall 22 of basket 12, the cable 28 having a means, such as a safety hook, at its opposite (upper) end for engaging a ring 90 welded to the front tubular member 40 of the upper frame 18. After the safety cable 86 is attached to the ring 90 on the upper frame 18, the operating lever of the chain binder 88 is operated to tension the safety cable 86 and lock it in its tensioned state. The safety cable 86 restrains the upper frame mounted rollers 20 from separating from the conductors A, B due to high winds, tipping on inclined conductors or other unforeseen conditions. In addition, the safety cable 86, provides a structural connection between the front member 40 of upper frame 18 and the front wall 22 of basket 12, creating a box-like structure around the conductor bundle, which strengthens and stabilizes the entire cart structure while it is on the conductors. Safety cable 86 is also attached whenever basket 12 is being lifted or moved by the helicopter H, except it is detached to allow conductors A, B, C to pass through opening 80 when the basket is being emplaced upon or removed from the conductors A, B.

The cart 10 is desirably emplaced on the energized power line conductors A, B by a helicopter H. A suspension cable 92 from the helicopter H is attached to a support or lifting harness 94 which is attachable to padeyes, rings, clevis fasteners or other attachment hardware 96 attached to the upper horizontal frame 18, e.g., to intermediate member 44, of the cart 10. The harness 94 includes at least one elongated insulated safety link 98 which allows the cart to be safely moved to or from power lines without fear of electrical injury to the lineman or workers or electrical damage to the helicopter H. The helicopter H carrying the cart 10 suspended by cable 92 and lifting harness 94 rises up to the power line where the lineman in cart 100 detaches safety cable 86 and helicopter H positions itself and the cart, as previously discussed, with the upper two conductors A, B of the bundle below and adjacent the conductor-engaging rollers 20 of the upper frame 18. See FIG. 4. Using a fiberglass wand (not shown) having a conductive hook (not shown) and a cable (not shown) attaching the hook to the basket 12, the lineman hooks the conductors A, B to equalize the electrical potential between the conductors A, B and the cart 10 and to assist the helicopter pilot in positioning the cart 10 relative to the conductors A, B by pulling the cart 10 and the conductors A, B toward each other. When the conductors A, B are close enough, the lineman, who is already at an equal potential with the conductors, grabs a conductor and installs a bond clamp on the conductor to maintain cart 100 at the same electrical potential as the conductors and to maintain cart 100 adjacent the conductors.

After the helicopter H lowers the rollers 20 onto the conductors A, B such that the weight of the cart 10 is supported by the conductors A, B, the lineman re-attaches safety cable 86 and engages one of the conductors A, B with a conductive grounding roller 100 (see FIGS. 3 and 4) affixed to the cart 10. To achieve this, the cart 10 includes, at a position on at least one of the side members 46, 48 of the upper frame 18 (shown here on the left side 46), aligned with either the front or rear pair of conductor-engaging rollers 20, a conductive grounding roller 100 pivotally mounted on a pivot arm 102 for pivotal movement between a storage position (see FIG. 4) wherein the grounding roller 102 is adjacent the side member 46, 48 of the upper frame 18 and an active position (see FIG. 10) wherein the grounding roller 100 is pivoted into contact with one of the upper conductors A, B. Arm 102 is pivotally cantilevered from the side member 46, 48 of the upper frame 18 and is joined to a spring-biased, over the center connector 103 which is also affixed to the side member 46, 48 of the upper frame 18. When the pivot arm 102 is pivoted to place grounding roller 100 into contact with an upper conductor A, B, it tensions the spring, locking the grounding roller 100 in contact with upper conductor A, B and insuring that the cart is maintained at the same electrical potential as the conductors. The lineman can now disengage and store the wand in the basket 12 and hook himself to the conductor A, B using a conductive lanyard and hook (not shown) which is electrically connected to the lineman. The suspension cable 92 may then be detached from the harness 94 and the helicopter H may depart. At this juncture, the lineman strengthens and stabilizes the cart structure by hooking safety cable 86, attached to chain binder 88 and supported by front wall 22 of basket 12, to ring 90 on front member 40 of upper frame 18 and operating the chain binder 88 to tension and lock the safety cable 86 in position.

It will be appreciated that basket 12 and upper frame 18 have been described herein as generally rectangular in shape because a generally rectangular shape is believed to be easiest and least expensive to construct and use. However, the configuration of basket 12 and upper frame 18 need not be limited to a generally rectangular shape. Indeed, each of basket 12 and upper frame 18 may be any shape which is consistent with its respective function, as described herein, and which provides a projecting bay in basket 12 in which the lineman in the cart can be in a safe and secure position, desirably seated, stabilized against sudden movements or tipping of the cart and protected against being struck by the conductors. Thus the shape of each of the basket 12 and upper frame 18 may be generally polygonal, i.e., comprising a closed planar shape having three or more usually straight, but acceptably arcuate sides, including a circular shape, if desired. Moreover, the shape of the basket 12 needn't be the same as the shape of the upper frame 18.

Referring now to FIGS. 11-15, there is shown a second embodiment of the cart of the present invention which comprises the same type of motorized cart as in FIGS. 1-10, i.e., a cart which can carry one or more power line workers (linemen), which is capable of being suspended from electrical power lines and which is movable along the lines under its own power. It will be appreciated from the foregoing discussion of the steep inclines sometimes encountered as a motorized cart travels along power lines that some inclines, particularly those encountered on lines installed between tall towers, are too severe to assure that sufficient and reliable traction can be achieved with the cart of FIGS. 1-10. Accordingly, the cart 200 of FIGS. 11-15 is a modification of cart 10 which is especially adapted for traveling along steep inclines in power lines under its own power. In the description of cart 200, like reference numerals refer to like elements of cart 10.

Referring to FIG. 13, cart 200 comprises a tubular, generally rectangular basket 12, tubular vertical support members 14, 16 extending upwardly from the basket 12 and a horizontal, generally rectangular tubular upper frame 18 supporting wheels or rollers 20 which engage with the power line conductors A, B. Rollers 20 may be electrically conductive, in which case they electrically interconnect cart 200 and power line conductors A, B. Alternatively, rollers 20 may be non-conductive, e.g., metal rollers coated with rubber or plastic rollers, in which case other means such as conductive ground rollers 100, as described and illustrated in connection with FIGS. 1-10, must be used on energized power lines to assure that cart 200 is maintained at the same electrical potential as the conductors A, B. The basket 12 comprises a generally rectangular tubular structure which, viewed from the front, has front wall 22 and left side and right side walls 24, 26 formed of expanded metal extending upwardly from a generally rectangular floor 28. Floor 28 is desirably formed of a strong, light weight metal, such as aluminum and is supported by tubular sub-structure therebeneath. The basket 12 is sufficiently spacious to allow at least one lineman to comfortably work on the power line conductors A, B, C while standing on the basket floor 28 and to provide space to store necessary equipment. L-shaped tubular projections 30 extend rearwardly and upwardly from the upper rear left and right side expanded metal walls 24, 26 for storing equipment used when servicing the power lines, such as spacers. The rear wall 32 of the basket 12 comprises a tubular structure which extends upwardly and rearwardly from the tubular sub-structure which supports basket floor 28 adjacent its rear edge 28*a* of the basket floor to define a rearwardly projecting bay 34 in which the lineman in the basket 12 may safely sit, with his buttocks supported by an intermediate horizontal tubular member 36 positioned above the height of the left and right side expanded metal walls 24, 26 and projecting rearwardly of the rear edge 28*a* of the basket floor 28. While seated, the lineman's back is supported by an upper horizontal tubular member 38 positioned above the intermediate tubular member 36 and projecting rearwardly of the intermediate tubular member. Rear wall 32 also includes vertical and horizontal tubular structure which supports intermediate horizontal tubular member 36 and upper horizontal tubular member 38 and provides tubular hand hold areas which the lineman can grasp to stabilize his position within the basket 12, particularly during cart travel along conductors and on/off conductor operations.

The pair of vertical tubular support members 14, 16, desirably of rectangular cross-section, extend upwardly from the left and right rear corners, respectively, of the tubular basket 12 and support a horizontal, generally rectangular tubular upper frame 18 which overhangs the basket floor 28 at a height above the lineman's head when he is standing in the basket 12. The upper frame 18 comprises a front 40, a rear 42 and at least one intermediate 44 tubular member, desirably of rectangular cross-section, extending from left to right across the upper frame 18. Tubular members 40, 42, 44 are joined to left and right side tubular members 46, 48, desirably of rectangular cross-section, extending front to back of the upper frame 18 to complete the desirably rectangular configuration of upper frame 18. Rollers 20 are supported by the upper frame 18 at each of the four inside corners thereof, thus allowing the rollers 20 to be positioned upon two spaced apart power line conductors A, B and to travel forward or backward along the conductors. In FIGS. 11-15, rollers 20 are illustrated as oversized as compared to rollers 20 in FIGS. 1-10. This highlights the point made earlier in this description that the dimensions of the rollers 20 are selected to correspond to the diameter of the conductors A, B upon which they will be positioned.

Where the cart 200 is to be emplaced upon the two upper conductors A, B of a three conductor A, B, C, triangularly configured bundle, side rollers 72, as described and illustrated in connection with FIGS. 1-10, are mounted in roller housings 74, oriented for rolling along the central lower conductor C and supported on elongated mounting bars 76 which extend upwardly from the roller housing 74 through each of the tubular sleeves 70 on each of the right and left side members 46, 48 of upper frame 18. The tubular sleeves 70 allow the elongated mounting bar 76 to slide vertically therewithin and allow side rollers 72 to be positioned between a storage position wherein the roller housings 74 are adjacent the lower end of the sleeves 70 and an active position wherein the rollers 72 are lowered into contact with the central lower conductor C. Locking means 78, such as apertures 77*a,b,c* in elongated mounting bar 76, stop bolt 79*a* and pin 79*b* for locking the side rollers 72 into one of the storage and active position are provided as hereinbefore described in connection with cart 10. When the side rollers 72 are in contact with the lower central conductor C, they maintain the conductor C in a lowered position relative to the two upper conductors A, B and out of contact with the underside 18*a* of the upper frame 18 of cart 10. Side rollers 72 also serve to maintain the three conductors A, B, C in their original triangular spacing should a spacer D therebetween have to be removed for replacement. A ratchet operated chain hoist (not shown) is attached to a shackle (not shown) on the top of the expanded metal wall side wall 24, 26 below the conductor C to assist the lineman in repositioning the lower central conductor C downwardly to the desired position before the side rollers 72 are lowered into contact therewith and locked in position.

Instead of each of the four rollers 20 being separately mounted on individual axes 50 as in the embodiment of FIGS. 1-10, in this second embodiment rollers 20 are mounted on two parallel axles 202, 204 which are journaled in end and central bearings 206, 208. The axles 202, 204 extend from front to back through the left and right side rollers 20, extend through the rear rollers 20*a*, 20*b* on each side and include end portions 202*a*, 204*a* projecting rearwardly of the upper frame 18. Each axle 202, 204 includes a first sprocketed drive wheel 210 on the rearwardly projecting end portion 202*a*, 204*a*. The first sprocketed drive wheel 210 on each axle 202, 204 is housed within a drive enclosure 212 having an outwardly facing open grid surface. Each metal enclosure 212 includes a second sprocketed drive wheel 214 positioned above the first sprocketed drive wheel 210. A hydraulic motor 216 mounted on the upper horizontal frame 18 and positioned adjacent each of the second (upper) sprocketed drive wheels 214 is driven by the engine 52/pump 54/hydraulic lines 58 fluid drive system of the cart 200 and, in turn, drives the second sprocketed drive wheels 214. Second sprocketed drive wheels 214 are connected via a chain drive 218 to and drive the first sprocketed drive wheels 210 which, in turn, drive axles 202, 204 mounting the four rollers 20. Thus, this arrangement provides a four roller (or wheel) drive for the cart 200. Each hydraulic motor 216 has an internal hydraulic brake (not shown) wherein a spring loaded brake shoe prevents the hydraulic motor 216 from operating until the hydraulic drive system of the cart 200 achieves a predetermined fluid pressure, at which time the force of the spring begins to be overcome by the hydraulic pressure, until a release hydraulic pressure is reached, e.g., 250 psi, at which point the internal brake is fully released. It will be recalled that the speed and direction of travel of the cart 200 is controlled by the lineman who operates a hydraulic valve 66 to increase or decrease the speed and a motor direction controller 68 to select the direction of movement. Thus, the lineman can slow or stop the movement of cart 200 along inclined conductors A, B by operating the hydraulic valve 66 to control hydraulic pressure (thus controlling internal hydraulic brake pressure) and the motor direction controller 68 to control direction.

To improve the traction of the rollers 20 along inclined conductors A, B beyond that attained by the four roller drive arrangement already described, at least two positive engagement rollers 220 are provided, at least one such roller 220 adapted for contacting each of the conductors A, B along its underside for urging the conductors A, B into closer engagement with the conductive drive rollers 20. To achieve this, on each of the front and rear members 40, 42 of the upper horizontal frame 18, at positions centrally aligned between the left and right side tubular steel members 46, 48, at least one tubular sleeve 222, preferably rectangular in cross-section, with its elongated opening vertically oriented, is rigidly mounted along the inside of the front and rear members 40, 42. In one form of the invention, two positive engagement rollers 220 are utilized, each mounted in a roller housing 224 and oriented in left to right alignment with, respectively, the front pairs 20c, 20d and rear pairs 20a, 20b of drive rollers for rolling along the underside of each of the conductors A, B on which the drive rollers 20 are emplaced. Positive engagement rollers 220 may be formed of any material capable of urging the conductors A, B into contact with drive rollers 20, such as hard plastic or, desirably, they may be rubber coated along those surfaces which contact conductors A, B for improved traction. The positive engagement roller housings 224 mount rollers 220 and are slidably positionable on an elongated roller positioning bar 226 by inserting one end 226a of the bar 226 through a roller housing sleeve 228 on the roller housing 224. Each roller positioning bar 226 includes a roller adjustment means 230 affixed to bar 226 adjacent the opposite end 226b thereof for urging the positive engagement roller 220 upwardly along bar 226 against the conductor A, B to force the conductor A, B into improved traction engagement with the drive rollers 20. In one form of the invention, the roller adjustment means 230 comprises an internally threaded elongate sleeve 232 rigidly attached to the roller positioning bar 226 with its elongate opening oriented parallel to the bar 226 and its axis in vertical registry with roller housing 224. Roller adjustment means 230 also includes an elongate, externally threaded drive bolt 234 which is threadable within the internally threaded sleeve 232. The free end 234a of drive bolt 234, having a handle 234b at its opposite end, is threaded through the internally threaded sleeve 232 toward the roller housing 224 until the free end 234a contacts the roller housing 224, which is freely slidable along the bar 226 and which rests on the roller adjustment means 230 when the bar is oriented vertically. As the bolt 234 is threaded into the sleeve 232 by turning the handle 234b counterclockwise, the bolt 234 moves the roller housing 224 away from the internally threaded sleeve 232. If desired, more than one positive engagement roller 220 may be employed in contact with each conductor A, B.

Most desirably, the cart 200 is emplaced on the power line conductors A, B by a helicopter H, as described in connection with cart 10 and FIGS. 1-10. After the helicopter H has departed, the lineman strengthens and stabilizes the cart structure by by hooking safety cable 86 attached to chain binder 88 to ring 90 on the front member 40 of upper frame 18 and operating chain binder 88 to tension and lock safety cable 86 in position. Thereafter, the lineman mounts roller positioning bar 226 (having roller housing 224 slidably mounted thereon and roller adjustment means rigidly attached thereto) on cart 200 by slidably inserting its free end 226a, i.e., the end furthest from the roller adjustment means 230, upwardly through one of the positive engagement roller positioning sleeves 222. The bar 226 is freely slidable vertically within sleeve 222 with the roller assembly 224 resting against the roller adjustment means 230. Roller positioning bar 226 is slid through sleeve 222 until the roller 220 is positioned in contact with or in very close proximity to the underside of conductor A, B. Roller positioning locking means 236 are provided to lock the roller positioning bar 226 within the sleeve 222 in a number of positions along its length. It is preferred to lock the positioning bar 226 in a position wherein the positive engagement roller 220 is closely adjacent the underside of conductor A, B. One preferred way of positioning the positive engagement roller 220 is to provide a series of spaced apart apertures 238 in positioning bar 226 which extend perpendicular to the length of the positioning bar 226 and a corresponding aperture 240 in roller positioning sleeve 222 which extends perpendicular to the vertical axis of sleeve 222. When the positive engagement roller 220 is positioned along the underside of conductor A, B, a pin 242 is inserted through the aligned apertures 240, 238 in the sleeve 222 and the mounting bar 226 to maintain the roller 220 in position. In order to force the conductors A, B upwardly into improved traction engagement with the conductive rollers 20, the bolt 234 of the roller adjustment means 230 is threaded into the internally threaded sleeve 232 by turning the handle 234b counterclockwise. In this manner the free end 234a of the bolt 234 pushes the roller assembly 224 and roller 220 towards conductor A, B. The positive engagement roller 220 forces the conductor A, B into tighter engagement with the drive rollers 20 to improve the drive traction between the conductive drive rollers 20 and the conductors A, B. Still further improved traction can be obtained by coating the surfaces of the rollers 20 which contact conductors A, B with rubber to improve traction. However, this makes the rollers 20 non-conductive and additional means, such as conductive grounding rollers 100 must be used on energized power lines to assure that the cart 200 is maintained at the same electrical potential as the conductors A, B.

Figure 16:
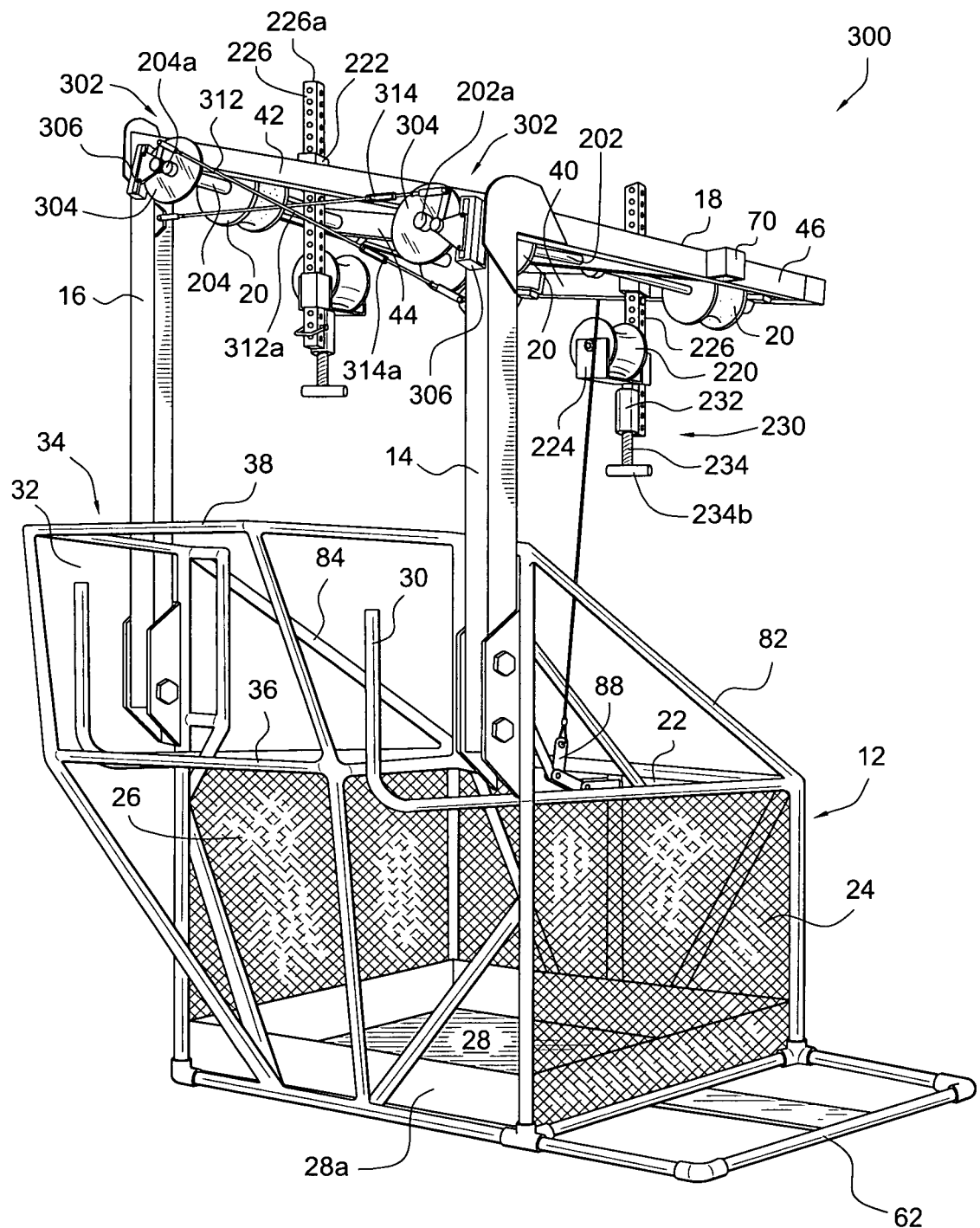
FIG. 16 is a perspective view of a non-motorized third embodiment of the cart of the present invention viewed from the rear left side.
Figure 17:
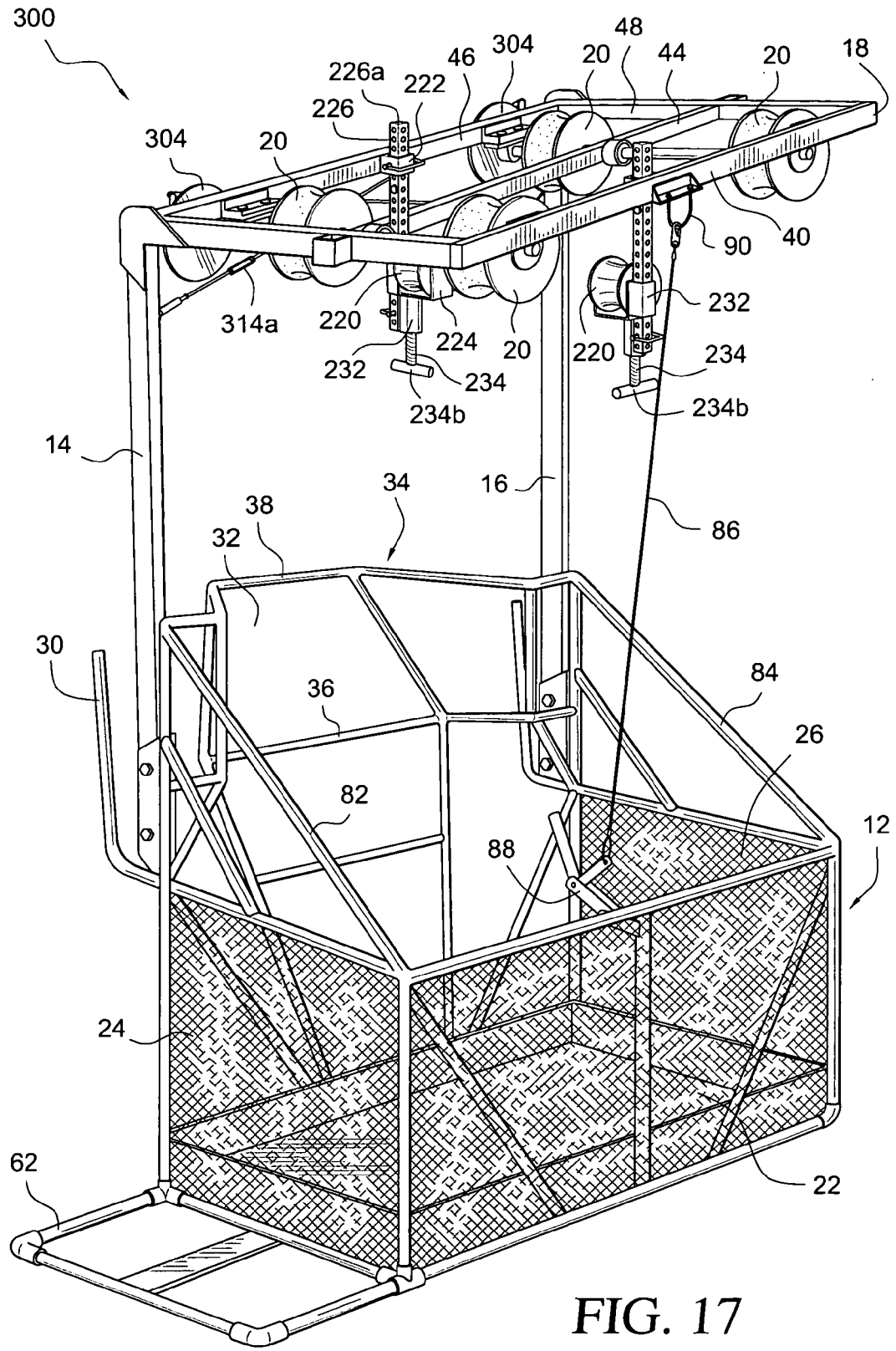
FIG. 17 is a perspective view of the cart of FIG. 16 viewed from the front left side.
Figure 18:
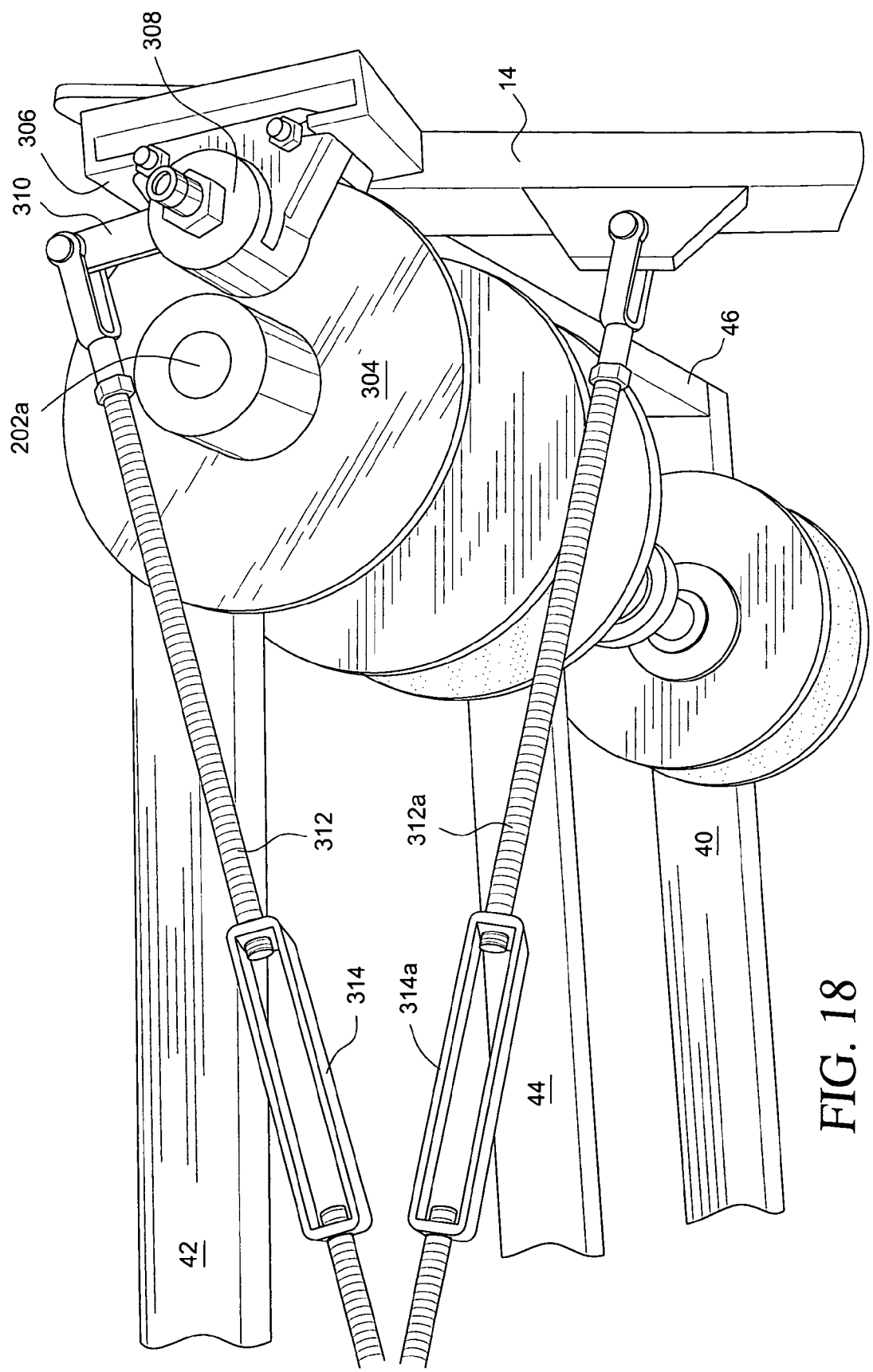
FIG. 18 is a perspective view of a portion of the disc brake assembly mounted on the cart of FIG. 16.

Referring now to FIGS. 16-18, there is shown a third embodiment of the present invention which comprises a non-motorized cart, hereinafter referred to as a trolley, having a configuration which is similar to the motorized carts of FIGS. 1-10 and FIGS. 11-15, i.e., a cart which can carry one or more power line workers (linemen) and which is capable of being suspended from electrical power lines to allow a lineman in the cart to service the conductors. However, unlike carts 10 and 200, trolley 300 is not able to travel along the power line under its own power. Instead, it must be moved along the conductors under external power, i.e., by towing. Trolley 300 is emplaced upon the conductors of a power line by a helicopter H and a tow line is attached, for example, to projecting tubular support member 62. Thereafter an external motive force, such as a winch (not shown) attached to the tow line provides the motive power to move trolley 300 along the conductors. Trolley 300 is intended for use on lines where the incline of the conductors is too severe to effectively use a self-propelled cart, such as lines installed between and/or leading to or away from tall power line support towers,. Accordingly, the trolley 300 of FIGS. 16-18 is a modification of cart 200 of FIGS. 11-15. In the description of trolley 300, like reference numerals refer to like elements of cart 200.

The configuration of trolley 300 is substantially identical to that of cart 200 illustrated in original FIGS. 11-15 except for the omission of propulsion features of cart 200, the addition of disc brakes and the inclination to the horizontal of upper frame 18, which mounts the conductor engaging rollers 20. Upper frame 18 of trolley 300 is desirably inclined downwardly from the horizontal at an angle of about 14°, although it will be appreciated that the incline to the horizontal may be anywhere between 0° and 45°. As can be seen most clearly in FIGS. 16 and 17, right side vertical support member 16 is taller than left side vertical support member 14 to create the downward incline of upper frame 18. The purpose of the incline is to minimize tipping of the cart on steeply inclined conductors and to maintain floor 28 of basket 12 on which the lineman stands as nearly horizontal as possible. In addition, because the trolley is not self-propelled, it does not include gasoline engine 52, hydraulic pump 54, hydraulic tank 56, hydraulic lines 58, fuel tank 64 and engine rpm and hydraulic direction and speed controls. In addition, it does not include hydraulic motors 216, sprocketed wheel drives 210, 214, drive enclosures 212 and chain drive 218.

Rollers 20 of trolley 300 are mounted on two axles which are journaled in end and central bearings 206, 208. The axles 202, 204 extend from front to back through the left and right side rollers 20, extend through the rear rollers 20a, 20b on each side and include end portions 202a, 204a projecting rearwardly of the upper frame 18. The rollers on each axle are horizontally parallel. Each axle 202, 204 includes a mechanically operated disc brake 302 on the rearwardly extending projecting portions 202a, 204a. Referring to FIG. 18, a rotor 304 is mounted to each axle 202, 204 and brake pads 306 are mounted adjacent the rotor 304 on a brake caliper 308 which includes an upwardly extending caliper arm 310. A cable 312, 312a extends through a turnbuckle 314, 314a and connects each caliper arm 310 to the opposite tubular vertical support member 14, 16. Turnbuckles 314, 314a are positioned along the cables 312, 312a at a location where they are easily accessible to a lineman seated in bay 34. The lineman rotates either or both of the turnbuckles 314, 314a in one direction to apply the brake 302 and in the opposite direction to release the brake 302. In this way, the lineman has dual brake controls in the event one of the brake controls fails, and can slow the speed of movement or stop the trolley 300 at any location along an inclined conductor to perform maintenance on the conductor.

In one illustrative application of the use of trolley 300, very tall near and far towers support a triangularly arranged bundle of conductors having two spaced apart parallel upper conductors A, B in a horizontal plane above a lower conductor C centrally positioned between conductors A, B, between the top portions of the towers and support one end of the conductors leading up to the top portion of the near tower and away from the top portion of the far tower. The conductors leading to and away from the top portions of the towers typically extend from traditional height support towers to the very tall near and far tower top portions and, therefore, are very steeply inclined along their length. Trolley 300 is emplaced on the very steeply inclined conductors of one of the towers, a pulley is mounted at the top of the tower and a cable tow line is attached to trolley 300 at the tubular extension 62 of the tubular floor sub-structure. The cable extends over the pulley and down to a ground mounted winch or other towing device. The lineman locks disc brakes 302 to prevent sliding of the trolley 300 along the conductors, hooks safety cable 86 to ring 90 on front member 40 of upper frame 18 and operates chain binder 88 to tension and lock safety cable 86 in position. Thereafter he mounts at least one roller positioning bar 226 (having positive engagement roller housing 224, including positive engagement roller 220, slidably mounted thereon and roller adjustment means 230 rigidly attached thereto) for each conductor A, B on trolley 300 by slidably inserting its free end 226a through one of the positive engagement roller positioning sleeves 222. Roller positioning bar 226 is slid through sleeve 222 until the roller 220 is positioned in contact with or in very close proximity to the underside of conductor A, B at which time it is pinned in position. Bolt 234 of roller adjustment means 230 is then threaded into internally threaded sleeve 232 to press positive engagement roller 220 against the underside of conductor A, B, forcing conductors A, B into tight engagement with the drive rollers 20 to improve traction between the drive rollers 20 and the conductors A, B in order to minimize slipping along inclined conductors. Still further improved traction can be obtained by coating the surfaces of the rollers 20, which contact conductors A, B, with rubber to improve traction. However, this makes the rollers 20 non-conductive and additional means, such as conductive ground rollers 100, as described and illustrated in connection with FIGS. 1-10 must be used on energized power lines to assure that the trolley 300 is maintained at the same electrical potential as the conductors A, B.

Where trolley 300 is emplaced upon the two upper conductors A, B of a three conductor A, B, C triangularly configured bundle, as in this illustration, side rollers 72, as described and illustrated in connection with FIGS. 1-15, mounted in roller housings 74 and supported on elongated mounting bars 76 extending through side roller sleeves 70 are arranged for rolling along the central lower conductor C. When the side rollers 72 are in contact with the lower central conductor C, they maintain the conductor C in a lowered position relative to the two upper conductors A, B and out of contact with the underside 18a of the upper frame 18 of cart 10. Side rollers 72 also serve to maintain the three conductors A, B, C in their original triangular spacing should a spacer D therebetween have to be removed for replacement.

The lineman in the basket 12 can perform the appropriate maintenance or repair on the conductors A, B and trolley 300 can move up and down inclines along the conductors by the lineman releasing disc brakes 302 and maintaining radio communication with the winch operator to raise or lower trolley 300 along conductors A, B. If the lineman believes the trolley's descent is too rapid or wishes to stop the descent to perform maintenance or repairs, he reaches up and operates turnbuckle 314 to apply the disc brakes 302 and stop the movement of the trolley 300 along the conductors A, B.

While the present invention has been described in terms of specific embodiments thereof, it will be understood that no limitations are intended to the details of construction or design other than as defined in the appended claims.

The invention claimed is:

1. A cart for moving at least one lineman along electrical power line conductors suspended from support structures for servicing the power lines, said cart adapted to be lifted by a lifting means onto said electrical power line conductors, said cart comprising:

basket means for carrying the lineman, said basket means having a floor and upwardly extending enclosing perimeter walls;

frame means overhanging said basket means, said frame means comprising a closed planar shape having three or more straight or arcuate sides or a circular shape, said frame means mounting travel roller means projecting below said frame means for supporting the basket weight on the conductors and for engaging with and rolling upon the power line conductors to facilitate movement of the cart along the conductors;

connecting means extending generally vertically between and interconnecting said frame means and said basket means with said basket means supported below said frame means, said frame means, said connecting means and said basket means defining a generally C-shaped opening, said frame means comprising one leg of said C-shape, said basket means comprising the other leg of said C-shape and said connecting means comprising the web of said C-shape, through which said conductors pass into vertical alignment with said travel roller means on said frame means when said lifting means lifts said cart to said conductors and moves it horizontally relative to said conductors through said opening, said lifting means lowering said travel roller means of said cart onto said conductors when said travel roller means and said conductors are in vertical alignment;

said basket means including a wall portion remote from said opening and projecting beyond said overhanging frame means and said floor, said connecting means being positioned between said opening and said remote basket wall portion for preventing said conductors from reaching said remote basket wall portion when said conductors pass through said opening, said projecting remote basket wall portion including means defining a seating area and hand holds for said lineman, whereby said connecting means and said projecting remote basket wall portion provide a protected area in said basket means where said lineman can be safely seated in a stable position during cart travel along conductors and during on/off conductor operations and where said lineman cannot be struck by the conductors.

2. A cart, as claimed in claim 1, further including an elongate safety cable affixed to said perimeter wall at said opening, said cable including means at one end adapted to be removably attached to said frame means at said opening and means for tensioning said safety cable between said basket means and said frame means, whereby said safety cable provides a structural connection between said basket means and said frame means which strengthens and stabilizes the cart structure.

3. A cart, as claimed in claim 1 or 2, wherein said conductors comprise a bundle including two parallel conductors arranged in a horizontal plane which is above any other conductors in the bundle and said travel roller means comprises at least two pair of travel rollers mounted on said frame means, each pair being positioned to be in vertical alignment with one of said two upper conductors when said cart is lifted to a position above said conductors, the travel rollers comprising each pair being spaced apart along the length of each said upper conductor and dimensioned for engaging and rolling along said conductors.

4. A cart, as claimed in claim 3, wherein said frame means is generally rectangular in shape.

5. A cart, as claimed in claim 3, wherein said frame means is generally planar and forms an angle with the horizontal of up to 45°, whereby one roller of each pair of rollers is positioned vertically higher than the other roller of each pair of rollers.

6. A cart, as claimed in claim 1 or 2, wherein said basket means is generally rectangular in shape and said perimeter walls include a front wall at said opening, said wall portion being a rear wall and a pair of side walls interconnecting said front and rear walls, said connecting means comprises at least one vertical support member extending upwardly from each said side wall for supporting said frame means and said remote basket wall portion comprises a bay area defined by said rear wall extending upwardly and rearwardly from the floor of said basket means, said bay area providing a protected area for said lineman which is rearward of said vertical support members and remote from said opening.

7. A cart, as claimed in claim 6, wherein said vertical support members extend upwardly from the rear of said side walls.

8. A cart, as claimed in claim 6, wherein said at least one vertical support member extending upwardly from one side wall is shorter than said at least one vertical support member extending upwardly from the other side wall and said frame means is inclined to the horizontal at an angle of up to 45°.

9. A cart, as claimed in claim 6, wherein said rear wall includes at least one upper horizontal member and at least one intermediate horizontal member positioned between said floor and said upper horizontal member, said intermediate horizontal member projects rearwardly of the rear edge of said basket floor and said upper horizontal member is positioned above and projects rearwardly of said intermediate horizontal member, whereby said lineman can comfortably sit on said intermediate horizontal member with his back supported by said upper horizontal member.

10. A cart, as claimed in claim 1 or 2, wherein said conductors comprise a bundle of three triangularly arranged conductors in which two conductors are parallel in the same horizontal plane and a third conductor is in a lower plane but is positioned centrally between the two upper conductors and said cart further includes third conductor roller means supported by said frame means in vertical registry with said third conductor when said cart is positioned on said two upper conductors, said third conductor roller means being movable vertically into contact with said third conductor for maintaining the three conductors substantially in their original triangular spacing.

11. A cart, as claimed in claim 10, wherein said frame means comprising comprises at least a front member at said opening, a rear member and a pair of side members interconnecting said front and rear members, said third conductor roller means comprising, on each frame side member, a third conductor elongate tubular sleeve mounted with its central opening oriented vertically and in vertical registry with said third conductor when said cart is positioned on said two upper conductors, an elongate mounting bar slidable in said third conductor sleeve, a roller dimensioned for engaging and rolling along said third conductor mounted on the lower end of said mounting bar and means for locking said roller in contact with said third conductor.

12. A cart, as claimed in claim 1 or 2, further including a grounding roller electrically connected to said cart and mounted on said frame means in vertical alignment with one of said upper conductors when said cart is positioned on said two upper conductors, said grounding roller being mounted for pivotal movement between a storage position wherein the grounding roller is out of contact with said conductors and an active position wherein said grounding roller is in electrical contact with one of said upper conductors.

13. A cart, as claimed in claim 3, further including means for driving at least two of said travel rollers for propelling said cart along said conductors.

14. A cart, as claimed in claim 13, wherein said means for driving comprises motor means operatively connected to said driven travel rollers.

15. A cart, as claimed in claim 14, further including at least one positive engagement roller means supported by said frame means for contacting the underside of each conductor which is engaged by a driven travel roller and urging said conductor into closer engagement with said driven travel rollers for improved traction.

16. A cart, as claimed in claim 15, wherein said frame means is generally rectangular in shape comprising at least a front member at said opening, a rear member and a pair of side members interconnecting said front and rear members, said positive engagement roller means comprising, a first elongate tubular sleeve mounted on said frame front and/or rear members with the axis of its central opening oriented vertically, the vertical extension of said axis extending adjacent to one of said two upper conductors when said cart is positioned on said two upper conductors, an elongate roller positioning bar slidable within said first sleeve, a positive engagement roller mounted on said positioning bar in vertical alignment with said adjacent conductor and dimensioned for engaging and rolling along said adjacent conductor, means for positioning said positive engagement roller closely adjacent the underside of said adjacent upper conductor and positive engagement roller adjustment means for urging said adjacent conductor upwardly into improved traction engagement with said driven travel rollers.

17. A cart, as claimed in claim 16, further including locking means for locking said slidable roller positioning bar in a fixed position and a second elongate tubular sleeve mounted on and slidable along said roller positioning bar below said first sleeve for slidably mounting on said roller positioning bar a positive engagement roller housing, within which said positive engagement roller is rotatably housed, said positive engagement roller adjustment means comprising a third elongate tubular sleeve rigidly attached to the lower end of said roller positioning bar with its central opening threaded and the axis of its central opening adjacent and parallel to the positioning bar and in vertical registry with said positive engagement roller housing and an externally threaded drive means threadable within said internally threaded third sleeve, one end of said drive means contacting said positive engagement roller housing and the other end comprising means for rotating said drive means for threading it through said third sleeve, whereby as the drive means is threaded through said third sleeve its one end forces the positive engagement roller into contact with said adjacent conductor for urging said adjacent conductor upwardly into improved traction engagement with said driven travel rollers.

18. A cart, as claimed in claim 17, wherein said first sleeve is centrally positioned between said frame side members on said front and/or rear frame members.

19. A cart, as claimed in claim 17, wherein said first sleeve is rectangular in cross-section and said roller positioning bar is rectangular in cross-section.

20. A cart, as claimed in claim 6, wherein said frame means is generally rectangular in shape comprising at least a front member at said opening, a rear member and a pair of side members interconnecting said front and rear members, a pair of axles extending between said front and rear members, each axle including two travel rollers spaced apart along the length of said axle and dimensioned for engaging and rolling along said conductors, said cart further including a mechanically operated disc brake on each axle, whereby the lineman can operate the disc brakes to slow or stop movement of the cart along the conductors.

21. A cart, as claimed in claim 20, wherein each disc brake comprises a rotor, brake pad and a brake caliper including a caliper arm, and a cable extends from each caliper arm through a turnbuckle to said opposite vertical support member, whereby the lineman can operate the turnbuckles to apply the disc brakes.

22. A cart, as claimed in claim 8, wherein said frame means is generally rectangular in shape comprising at least a front member at said opening, a rear member and a pair of side members interconnecting said front and rear members, a pair of axles extending between said front and rear members, each axle including two travel rollers spaced apart along the length of said axle and dimensioned for engaging and rolling along said conductors, said cart further including a mechanically operated disc brake on each axle, whereby the lineman can operate the disc brakes to slow or stop movement of the cart along the conductors.

23. A cart, as claimed in claim 22, wherein each disc brake comprises a rotor, brake pad and a brake caliper including a caliper arm, and a cable extends from each caliper arm through a turnbuckle to said opposite vertical support member, whereby the lineman can operate the turnbuckles to apply the disc brakes.

24. A cart for moving at least one lineman along electrical power line conductors suspended from support structures for servicing the power lines, said conductors comprising a bundle of three triangularly arranged conductors in which two conductors are parallel in the same horizontal plane and a third conductor is in a lower plane but is positioned centrally between the two upper conductors, said cart adapted to be lifted by a lifting means onto said electrical power line conductors, said cart comprising:
  basket means for carrying the lineman, said basket means having a floor and enclosing perimeter walls;
  frame means overhanging said basket means, said frame means mounting travel roller means projecting below said frame means for engaging with and rolling upon the two upper, parallel power line conductors to facilitate movement of the cart along the conductors, said frame means comprising a closed planar shape having three or more straight or arcuate sides;
  said cart further including third conductor roller means supported by said frame means in vertical registry with said third conductor when said cart is positioned on said two upper conductors, said third conductor roller means being movable vertically into contact with said third conductor for maintaining the three conductors substantially in their original triangular spacing;
  connecting means extending generally vertically between and interconnecting said frame means and said basket means with said basket means supported below said frame means, said frame means, said connecting means and said basket means defining a generally C-shaped opening between said frame means and said basket means through which said conductors pass into vertical alignment with said travel roller means on said frame means when said lifting means lifts said cart to said conductors and moves it horizontally relative to said conductors through said opening, said lifting means lowering said travel roller means of said cart onto said conductors when said travel roller means and said conductors are in vertical alignment;
  said frame means comprising at least a front member at said opening, a rear member and a pair of side members interconnecting said front and rear members, said third conductor roller means comprising, on each frame side member, a third conductor elongate tubular sleeve mounted with its central opening oriented vertically and in vertical registry with said third conductor when said cart is positioned on said two upper conductors, an elongate mounting bar slidable in said third conductor sleeve, a roller dimensioned for engaging and rolling along said third conductor mounted on the lower end of said mounting bar and means for locking said roller in contact with said third conductor;

said basket means including a portion remote from said opening, said connecting means being positioned between said opening and said remote basket portion for preventing said conductors from reaching said remote basket portion when said conductors pass through said opening, whereby said connecting means provide a protected area in said basket means where said lineman cannot be struck by the conductors.

25. A cart, as claimed in claim 24, further including an elongate safety cable affixed to said perimeter wall at said opening, said cable including means at one end adapted to be removably attached to said frame means at said opening and means for tensioning said safety cable between said basket means and said frame means, whereby said safety cable provides a structural connection between said basket means and said frame means which strengthens and stabilizes the cart structure.

\* \* \* \* \*